US012068909B2

(12) United States Patent
Pan et al.

(10) Patent No.: US 12,068,909 B2
(45) Date of Patent: Aug. 20, 2024

(54) BEAM FAILURE RECOVERY

(71) Applicant: Sony Group Corporation, Tokyo (JP)

(72) Inventors: Kyle Jung-Lin Pan, Saint James, NY (US); Fengjun Xi, San Diego, CA (US); Afshin Haghighat, Ile-Bizard (CA); Moon-il Lee, Melville, NY (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/215,198

(22) Filed: Jun. 28, 2023

(65) Prior Publication Data
US 2023/0344701 A1    Oct. 26, 2023

Related U.S. Application Data

(63) Continuation of application No. 17/391,071, filed on Aug. 2, 2021, now Pat. No. 11,722,361, which is a
(Continued)

(51) Int. Cl.
*H04L 41/0654* (2022.01)
*H04B 7/06* (2006.01)
(Continued)

(52) U.S. Cl.
CPC ....... *H04L 41/0654* (2013.01); *H04B 7/0695* (2013.01); *H04B 7/088* (2013.01);
(Continued)

(58) Field of Classification Search
CPC .. H04L 41/0654; H04L 5/0048; H04W 72/21; H04W 72/23; H04W 56/001; H04W 74/0833; H04B 7/0695; H04B 7/088
See application file for complete search history.

(56) References Cited

U.S. PATENT DOCUMENTS 10,116,349 B2    10/2018 Stirling-Gallacher et al.
10,128,991 B2    11/2018 Marinier et al.
(Continued)

FOREIGN PATENT DOCUMENTS

CN    104247291 A    12/2014
WO    2016/165128 A1    10/2016

OTHER PUBLICATIONS

3rd Generation Partnership Project (3GPP), R1-1612059, "Beam Recovery Procedures", Qualcomm Incorporated, 3GPP TSG RAN WG1 Meeting #87, Reno, Nevada, USA, Nov. 14-18, 2016, 3 pages.
(Continued)

*Primary Examiner* — Chandrahas B Patel
(74) *Attorney, Agent, or Firm* — XSENSUS LLP

(57) ABSTRACT

Systems, methods and instrumentalities are disclosed for WTRU-initiated beam recovery including beam switching and/or beam sweeping. A WTRU may be configured to detect a beam failure condition, identify a candidate beam for resolving the beam failure condition, and send a beam failure recovery request to a network entity. The WTRU may include the candidate beam in the beam failure recovery request and may receive a response from the network entity regarding the request and/or a solution for the beam failure condition. WTRU-initiated beam recovery may be used to resolve radio link failures and improve system performance by avoiding the necessity to perform an acquisition procedure. Additionally, beam sweeping may be performed at a sub-time unit level to provide a fast sweeping mechanism.

16 Claims, 27 Drawing Sheets

Related U.S. Application Data continuation of application No. 16/475,735, filed as application No. PCT/US2018/012563 on Jan. 5, 2018, now Pat. No. 11,082,286.

(60) Provisional application No. 62/519,614, filed on Jun. 14, 2017, provisional application No. 62/500,884, filed on May 3, 2017, provisional application No. 62/454,486, filed on Feb. 3, 2017, provisional application No. 62/443,382, filed on Jan. 6, 2017.

(51) Int. Cl.
    *H04B 7/08*     (2006.01)
    *H04L 5/00*     (2006.01)
    *H04W 56/00*     (2009.01)
    *H04W 72/21*     (2023.01)
    *H04W 72/23*     (2023.01)
    *H04W 74/0833*     (2024.01)

(52) U.S. Cl.
    CPC ......... *H04L 5/0048* (2013.01); *H04W 56/001* (2013.01); *H04W 72/21* (2023.01); *H04W 72/23* (2023.01); *H04W 74/0833* (2013.01)

(56) References Cited

U.S. PATENT DOCUMENTS

| | | | |
|---|---|---|---|
| 10,476,563 B2* | 11/2019 | Stirling-Gallacher | ........................ H04L 27/261 |
| 11,272,538 B2* | 3/2022 | Zhao | ................... H04L 25/0226 |
| 11,350,291 B2 | 5/2022 | Kakishima et al. | |
| 2018/0359790 A1 | 12/2018 | Ingale et al. | |
| 2019/0261341 A1 | 8/2019 | Tang et al. | |

OTHER PUBLICATIONS

3rd Generation Partnership Project (3GPP), R1-1612131, "Beam Recovery Considerations for Above-6 GHZ", MediaTek Inc., 3GPP TSG RAN WG1 Meeting #87, Reno, Nevada, USA, Nov. 14-18, 2016, 3 pages.

3rd Generation Partnership Project (3GPP), R1-1612189, "Discussion on Beam Recover for NR", CMCC, 3GPP TSG RAN WG1 #87, Reno, USA, Nov. 14-18, 2016, 4 pages.

3rd Generation Partnership Project (3GPP), R1-1700350, "CSI-RS Structure for Beam Management", Intel Corporation, 3GPP TSG RAN WG1 NR Ad-Hoc Meeting, Spokane, USA, Jan. 16-20, 2017, pp. 1-7.

3rd Generation Partnership Project (3GPP), TR 38.913 V0.3.0, "Technical Specification Group Radio Access Network, Study on Scenarios and Requirements for Next Generation Access Technologies (Release 14)", Mar. 2016, 30 pages.

Alkhateeb et al., "MIMO Precoding and Combining Solutions for Millimeter-Wave Systems", IEEE Communications Magazine, vol. 52, No. 12, Dec. 2014, pp. 122-131.

ZTE Corporation, et al., R1-1608675 On Qusai-Co-Location/ Beam for NR MIMO, 3GPP TSG RAN WG1 Meeting #86bis Oct. 14, 2016.

ZTE, et al., R1-1611422 Discussion on beam recovery mechanism, 3GPP TSG RAN WG1 Meeting #87 Nov. 18, 2016.

* cited by examiner

BEAM FAILURE RECOVERY

CROSS-REFERENCE TO RELATED APPLICATIONS

This application is a continuation of U.S. application Ser. No. 17/391,071, filed Aug. 2, 2021, which is a continuation of U.S. application Ser. No. 16/475,735, filed Jul. 3, 2019 (now U.S. Pat. No. 11,082,286), which is National Stage entry under 35 U.S.C. § 371 of Patent Cooperation Treaty Application PCT/US2018/012563, filed Jan. 5, 2018, which claims the benefit of U.S. Provisional Patent Application No. 62/519,614, filed Jun. 14, 2017, U.S. Provisional Patent Application No. 62/500,884, filed May 3, 2017, U.S. Provisional Patent Application No. 62/454,486, filed Feb. 3, 2017, and U.S. Provisional Patent Application No. 62/443,382, filed Jan. 6, 2017, the entire contents of each are incorporated herein by its reference.

BACKGROUND

Mobile communication systems continue to evolve. A fifth generation may be referred to as 5G. A mobile communication system may implement a variety of radio access technologies (RATs), such as New Radio (NR). Use cases for NR may include, for example, enhanced Mobile Broadband (eMBB), Ultra-Reliable Low Latency Communications (URLLC) and massive Machine Type Communications (mMTC).

SUMMARY

Systems, methods and instrumentalities are disclosed for WTRU initiated beam recovery including beam switching and/or beam sweeping. A wireless transmit receive unit (WTRU) may be configured to determine that a beam failure condition associated with transmissions between the WTRU and a network entity (e.g., a gNB) has occurred. The WTRU may determine the occurrence of the beam failure condition based on a determination that one or more (e.g., all) serving beams associated with transmissions between the WTRU and the network entity have failed. The WTRU may monitor at least one of a channel state information-reference signal (CSI-RS) or a synchronization signal block (SSB) to assess whether the beam failure condition has been met. The CSI-RS or the SSB may be associated with a physical downlink control channel (PDCCH) demodulation reference signal (DM-RS) through spatial quasi-collocation (QCL).

The WTRU may identify a candidate beam for resolving the beam failure condition described above and may transmit a beam failure recovery request to the network entity. Such a beam failure recovery request may also be referred to herein as a beam recovery request. The WTRU may identify the candidate beam by measuring beam quality on at least one of a CSI-RS or a SSB. The WTRU may indicate the candidate beam in the beam failure recovery request. The beam failure recovery request may be transmitted using a Physical Random Access Channel (PRACH) resource or a Physical Uplink Control Channel (PUCCH) resource. The PRACH resource or PUCCH resource used to transmit the beam failure recovery request may be associated with at least one of a reference signal or a synchronization signal block. The WTRU may select the PRACH resource or PUCCH resource based on an uplink synchronization status.

The WTRU may receive a response from the network entity regarding the beam failure recovery request. The WTRU may monitor a downlink control channel for the response from the network entity. The downlink control channel may be associated with all serving beams of the WTRU. The WTRU may receive the response from the network entity after a pre-defined number of time slots upon sending the beam failure recovery request. The WTRU may determine a beam for receiving a downlink transmission in response to receiving, from the network entity, a beam indication associated with a control region and an explicit signal included in downlink control information (DCI) or in a medium access control (MAC) control element (CE).

BRIEF DESCRIPTION OF THE DRAWINGS

A more detailed understanding may be had from the following description, given by way of example in conjunction with the accompanying drawings wherein.

DETAILED DESCRIPTION

Figure 1A:
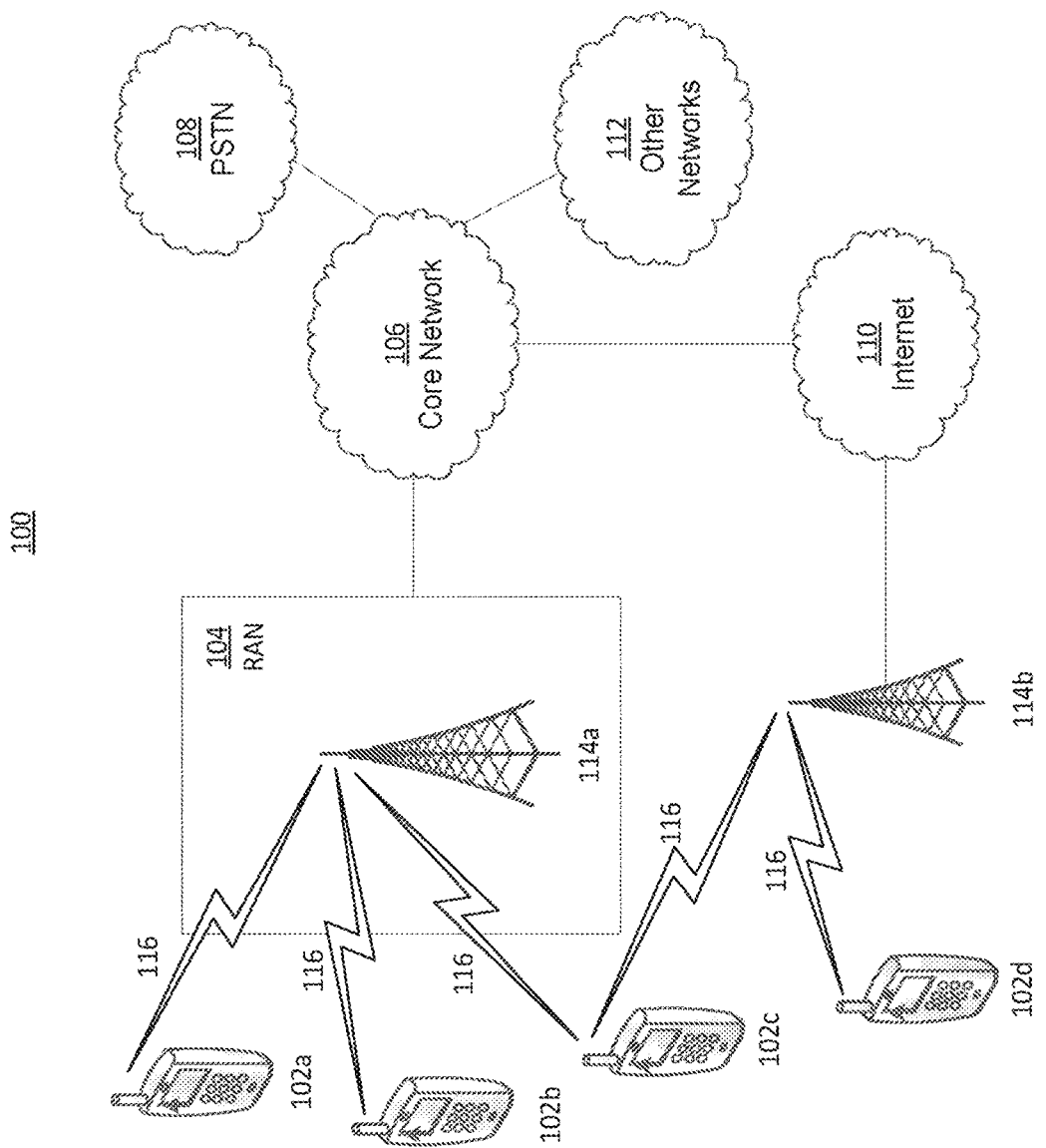
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WT RU 102c shown in FIG. 1A may be configured to communicate with the base station 114a, which may employ a cellular-based radio technology, and with the base station 114b, which may employ an IEEE 802 radio technology.

Figure 1B:
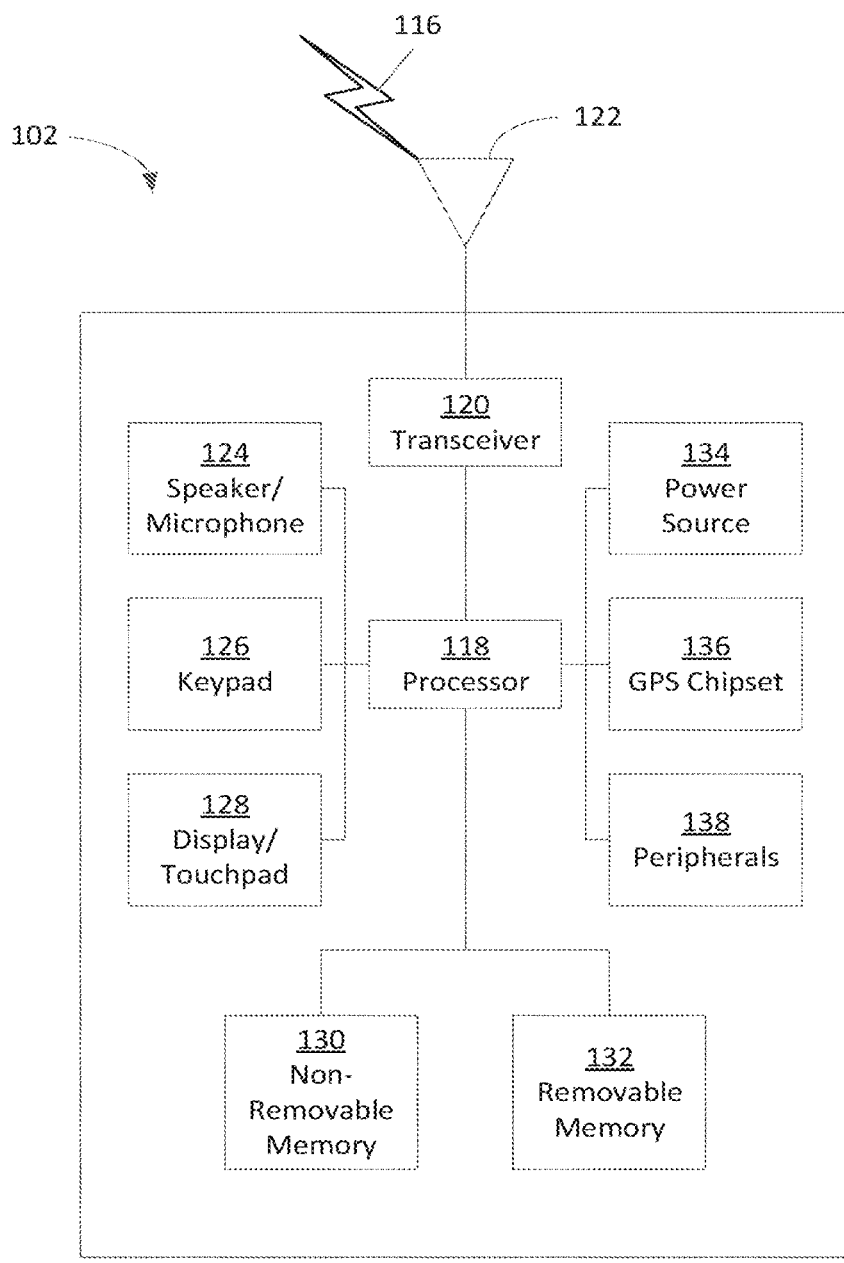
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
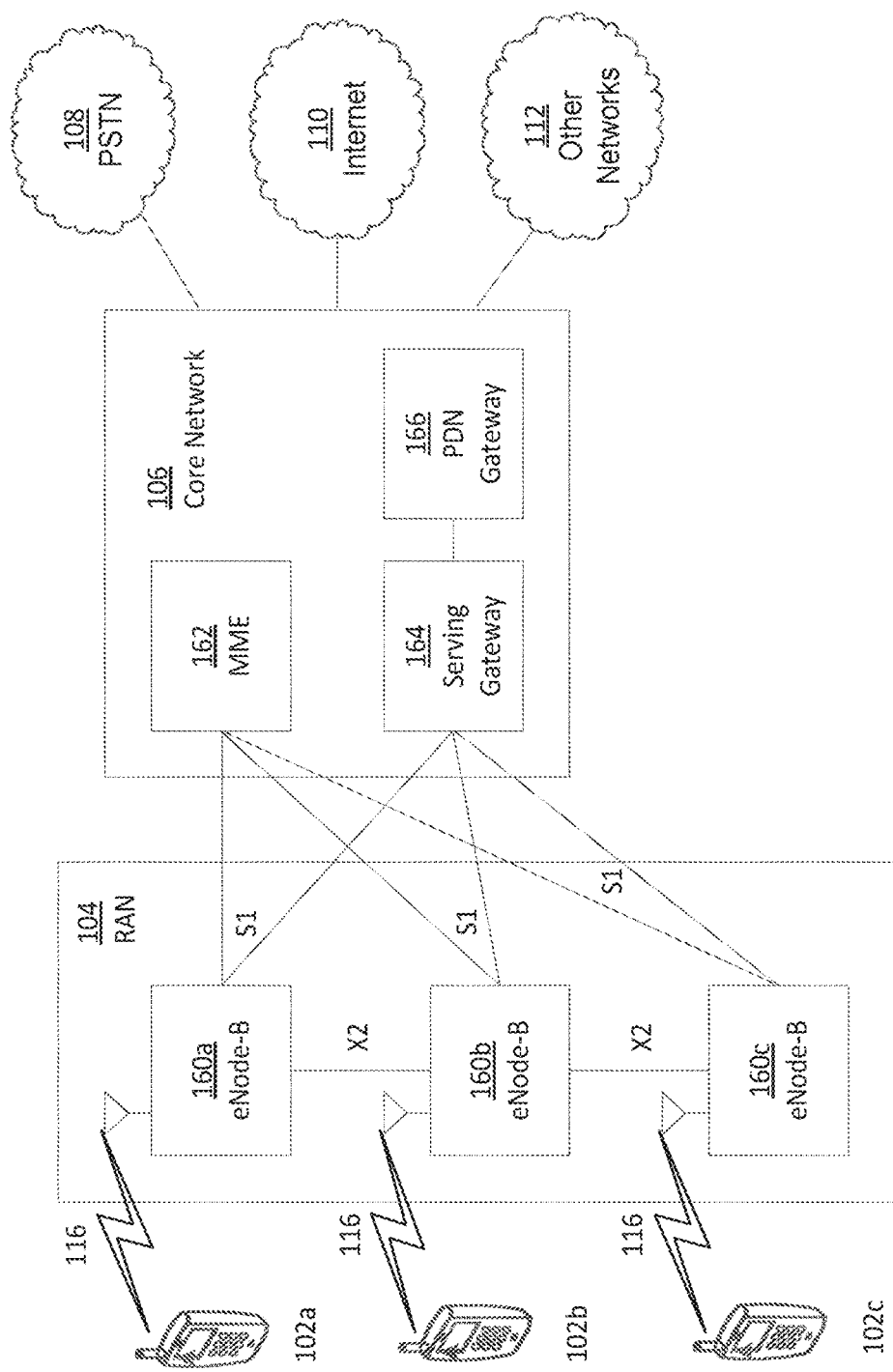
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
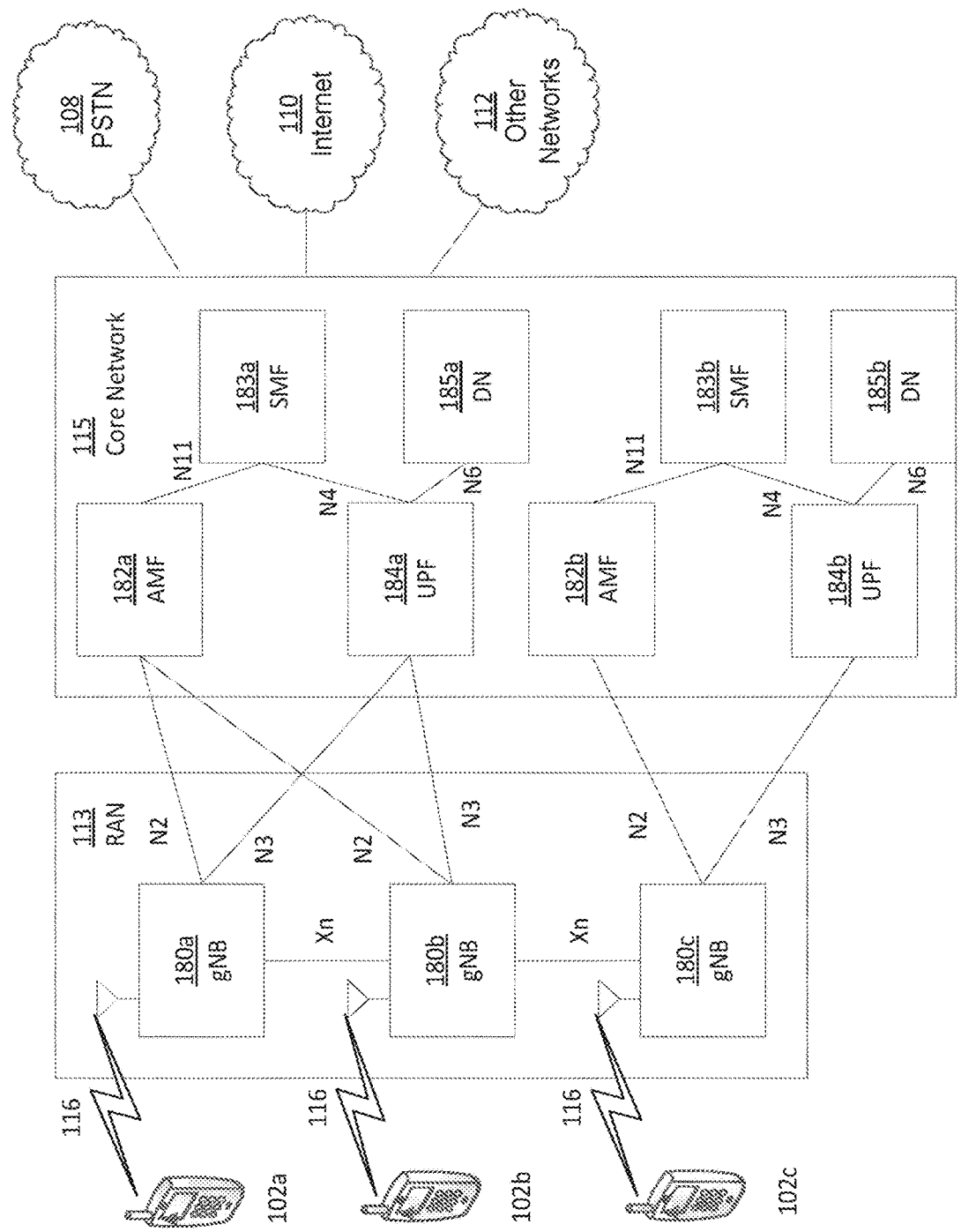
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Multi-antenna transmission and beamforming may be implement in a wireless communication system. Multi-antenna techniques may include Multiple Input Multiple Output (MIMO) and variations of MIMO (e.g., Single Input Multiple Output (SIMO) and Multiple Input Single Output (MISO), etc.), which may be utilized in sub-6 GHz transmission. MIMO techniques may be associated with diversity gain, multiplexing gain, beamforming, array gain, etc. User Terminals (UTs) in cellular communication may communicate with a central node (e.g., a single central node). MU-MIMO may increase system throughput, for example, by facilitating the transmission of multiple data streams to different UTs at the same time and/or on the same and/or overlapping set of resources (e.g., in terms of time and/or frequency). A central node implementing SU-MIMO may transmit multiple data streams to the same UT. A central node implementing MU-MIMO may transmit to multiple UTs.

Multiple antenna transmission at millimeter wave frequencies may differ from that using sub-6 GHz multiple antenna techniques. This may be due to different propagation characteristics at millimeter wave frequencies and/or a base transceiver station (BTS)/WTRU potentially having a limited number of RF chains compared to antenna elements.

Figure 2:
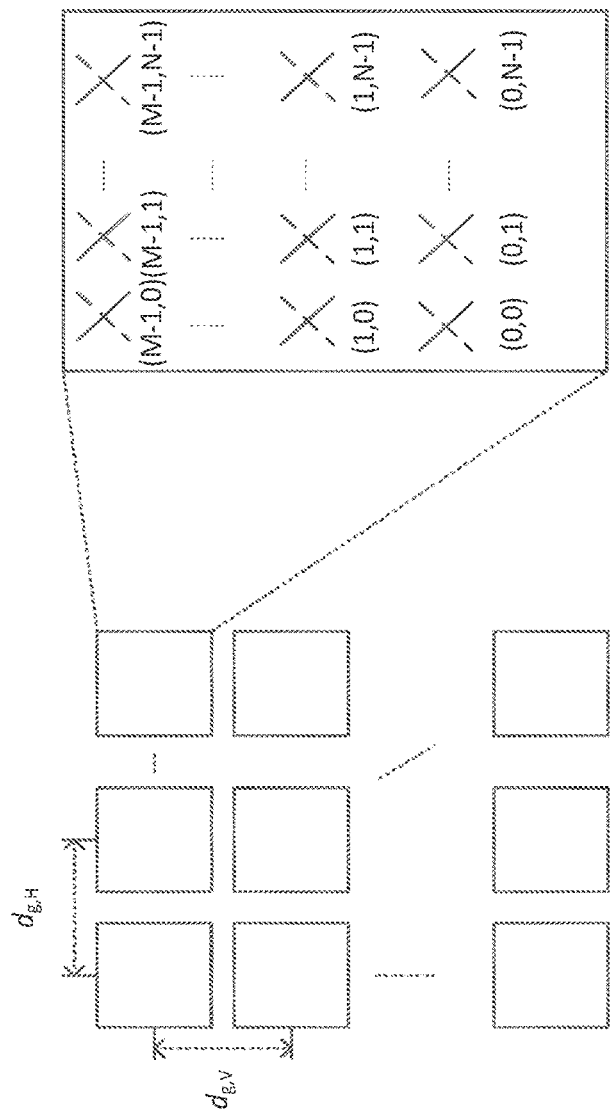
FIG. 2 is a diagram illustrating an example antenna model for a Transmission/Reception Point (TRP) and/or a WTRU.

FIG. 2 is a diagram illustrating an example antenna model for a TRP and/or a WTRU. Note that the term TRP as used herein may cover a variety of devices that are capable of sending and/or receiving wireless signals. For example, a TRP may be a network entity such as a base station (e.g., a gNB). As shown in FIG. 2, a massive antenna model may be configured to include Mg antenna panels per vertical dimension and Ng antenna panels per horizontal dimension. An (e.g., each) antenna panel may be configured with N columns and M rows of antenna elements with or without polarization (e.g., as shown in FIG. 2). Timing and phase may not be calibrated across panels although multiple panels may be associated with a same base station (e.g., a base station may be equipped with multiple panels). A baseline massive antenna configuration may vary according to operating frequency bands, for example, as indicated in Table 1. Table 1 provides examples of baseline massive antenna configurations for dense urban and urban macro.

TABLE 1

| At 4 GHz | At 30 GHz | At 70 GHz |
|---|---|---|
| Dense urban and urban macro: (M, N, P, Mg, Ng) = (8, 8, 2, 1, 1), (dV, dH) = (0.8, 0.5)λ | Dense urban and urban macro: (M, N, P, Mg, Ng) = (4, 8, 2, 2, 2), (dV, dH) = (0.5, 0.5)λ, (dg, V, dg, H) = (2.0, 4.0)λ | Dense urban: Baseline: (M, N, P, Mg, Ng) = (8, 16, 2, 2, 2), (dV, dH) = (0.5, 0.5)λ, (dg, V, dg, H) = (4.0, 8.0) λ |
| A single panel 64 elements per Pol. Total 128 elements | 4 panels 32 elements per Pol. Total 256 elements | 4 panels 128 elements per Pol. Total 1024 elements |

Precoding at millimeter wave (mmW) frequencies may use digital, analog or a hybrid of digital and analog techniques. Digital precoding may be precise and may be combined with equalization. Digital precoding may enable single user (SU), multi-user (MU) and multi-cell precoding and may be similar to that used in sub 6 GHz (e.g., in IEEE 802.11n and beyond and in 3GPP LTE and beyond). The presence of a limited number of RF chains compared with antenna elements and the sparse nature of the channel may complicate the use of digital beamforming (e.g., in mmW frequencies). Analog beamforming may overcome the limited number of RF chains, for example, by using analog phase shifters on each antenna element. Analog beamforming may be used in IEEE 802.11ad during Sector Level Sweep (e.g., to identify the best sector), Beam Refinement (e.g., to refine the sector to an antenna beam) and beam tracking (e.g., to adjust sub-beams over time to account for change in the channel) procedures. Hybrid beamforming may divide a precoder between analog and digital domains. Each domain may have precoding and combining matrices with different structural constraints (e.g., constant modulus constraint) for combining matrices in the analog domain. This may result in a compromise between hardware complexity and system performance. Hybrid beamforming may achieve digital precoding performance due to the sparse nature of channels and support for multi-user/multi-stream multiplexing. Hybrid beamforming may be limited by a number of RF chains, which may not be an issue where mmW channels are sparse in the angular domain.

Beam management or recovery may be performed in NR. Use of higher band frequencies may imply that their propagation characteristics may influence the system design. A channel may experience higher path losses and more abrupt changes as frequencies increase, e.g., due to the fact that transmission through most objects may be reduced, that reflections may be amplified, and/or that blockage, WTRU rotation and/or WTRU movement may occur.

A large-scale antenna array may be used (e.g., in high frequency bands) to achieve high beamforming gain. Such high beamforming gain may compensate for high propagation loss. The resulting coupling loss may be kept at a high level, e.g., to support a desired data throughput or coverage. Use of directional beam based communication may involve accurate beam pairing. A correct beam direction may be associated with a real channel, e.g., in terms of an angle of arrival and angle of departure in azimuth and elevation. A correct beam direction may be (e.g., dynamically) adjusted with a channel change.

A technique or DL beam management procedure (e.g., P-1) may be used to enable WTRU measurement on different TRP Tx beams, e.g., to support selection of TRP Tx beams/WTRU Rx beams. P-1 may include an intra/inter-TRP Tx beam sweep from a set of different beams, e.g., for beamforming at a TRP. P-1 may include a WTRU Rx beam sweep from a set of different beams, e.g., for beamforming at a WTRU. A TRP Tx beam and WTRU Rx beam may be determined jointly or sequentially.

A technique or DL beam management procedure (e.g., P-2) may be used to enable WTRU measurement on different TRP Tx beams, for example, to change inter/intra-TRP Tx beam(s), e.g., from a smaller set of beams than P-1 for beam refinement. P-2 may be a special case of P-1. A technique or DL beam management procedure (e.g., P-3) may be used to enable WT RU measurement on the same TRP Tx beam to change a WTRU Rx beam, for example, when WTRU uses beamforming. A technique or UL beam management procedure (e.g., U-1) may be used to enable a TRP measurement on different WTRU Tx beams, e.g., to support selection of WTRU Tx beams/TRP Rx beams. A technique OR UL beam management procedure (e.g., U-2) may be used to enable a TRP measurement on different TRP Rx beams, e.g., to change/select inter/intra-TRP Rx beam(s). A technique or UL beam management procedure (e.g., U-3) may be used to enable TRP measurement on the same TRP Rx beam, for example, to change a WTRU Tx beam, e.g., when a WTRU uses beamforming. P-1/P-2/P-3 may be used interchangeably herein with P1/P2/P3. U-1/U-2/U-3 may be used interchangeably herein with U1/U2/U3.

CSI-RS may be used to support DL Tx beam sweeping and/or WTRU Rx beam sweeping. CSI-RS may be used, for example, in association with P-1, P-2 and/or P-3. NR CSI-RS may support a mapping structure in which NP CSI-RS port(s) may be mapped per time unit or sub-time unit. One or more CSI-RS antenna ports may be mapped across time units or sub-time units. A "time unit" may correspond to n OFDM symbol(s) (e.g., n>=1) in a configured or reference numerology. OFDM symbols comprised in a time unit may or may not be consecutive. A port multiplexing procedure may utilize one or more of frequency division multiplexing (FDM), time division multiplexing (TDM) or code division multiplexing (CDM).

A time unit may be partitioned into sub-time units. A partitioning procedure may utilize one or more of TDM, IFDMA or OFDM. An OFDM symbol-level partition may have the same or shorter OFDM symbol length compared to a reference OFDM symbol length. A OFDM symbol length may be associated with subcarrier spacing. A shorter OFDM symbol length may be associated with larger subcarrier spacing.

A mapping structure such as that described above may be used to support multiple panels and/or Tx chains. A mapping structure such as that described above may be configured with one or more CSI-RS resource configurations.

CSI-RS may be mapped for Tx and Rx beam sweeping. Tx beams may be the same or may be different across sub-time units within a time unit. Tx beams may be the same or may be different across time units. Tx beams may be the same across sub-time units in a first time unit and may be different across sub-time units in a second time unit. Different time units may be combined, e.g., in terms of number and periodicity. Tx-only or Rx-only sweeping may be implemented.

Signal propagation (e.g., in a high frequency band or system) that may rely on beamforming may be sensitive to WTRU movement, rotation, blockage, and/or other types of interferences. Periodic beam management may be performed. A fast beam recovery mechanism (e.g., an event-driven beam recovery mechanism) may reduce (e.g., minimize) disruption of service. Events that may trigger beam recovery may include, for example, beam quality degradation due to WTRU mobility, WTRU rotation, blockage, dynamic change in link quality, link failure, and/or the like. Network triggered beam recovery may not be fast enough to handle these events. WTRU-initiated (e.g., WTRU-triggered) beam recovery (e.g., WTRU-initiated beam switching and/or beam sweeping) may be used in addition to or in lieu of network-triggered beam recovery. The term "beam recovery" may be used interchangeably herein with the term "beam failure recovery."

Using a WTRU-initiated beam recovery mechanism, a WTRU may send a beam recovery request (e.g., a beam failure recovery request) to a network entity (e.g., a TRP). The beam recovery request may be related to beam switching. The beam recovery request may include an indication of a beam failure and/or an indication of a candidate beam that may be used to recover from (e.g., to resolve) the beam failure. A TPR (e.g., a base station) may accept (e.g., confirm) or override a beam recovery (e.g., beam switching) recommendation from a WTRU. A TRP may indicate (e.g., in a DL transmission) beam-related information for beam switching. The beam-related information may include an alternative beam for the WTRU to use, for example. A TRP may indicate information associated with DL control, DL data reception, UL control, and/or UL data transmission.

A WTRU-initiated beam recovery request may be related to beam sweeping. A beam sweeping request may be sent when beam switching may not be immediately available or performed, e.g., due to a lack of knowledge about beam association or beam pairing. A WTRU may initiate beam sweeping before beam switching. Beam sweeping may be completed in a timely manner, for example, when an antenna system has a high degree of spatial dimension and/or high spectrum efficiency. Fast beam sweeping may provide support for beam pairing and WTRU-initiated beam switching.

Beam quality degradation may occur due to various reasons including WTRU mobility, WTRU rotation, blockage, link failure, and/or the like. These events may occur randomly and/or regularly. The degradation may lead to radio link failure (RLF) and RRC connection re-establishment, which may increase latency and decrease throughput. For example, a WTRU may try to reconnect with an RRC Connection Reestablishment entity when the WTRU detects an RLF. When the RRC connection reestablishment attempt fails, a session may be dropped.

Beam-centric RLF detection may be performed. A quick beam recovery mechanism (e.g., beam switching) may be used to avoid the burden and/or communication interruption associated with the performance of an acquisition procedure (e.g., an initial acquisition procedure), e.g., due to radio link failure and/or RRC connection re-establishment. Radio link failures may be detected and declared later or less frequently through beam recovery (e.g., beam switching).

A beam pair link may comprise a Tx beam and a Rx beam. An Rx beam may be associated with a spatial QCL parameter, an Rx receive weighting, and/or a receiver configuration. A set of beamforming weight(s) may be applied to a particular set of physical antennas and/or antenna panels. A Tx beam may be associated with a reference signal, such as a CSI-RS. A CSI-RS may be beamformed. Beam switching may involve Tx beam switching and/or Rx beam switching. Beam pairing may be interchangeably used herein with beam association or beam pair link set (BPLS).

Beam switching (e.g., when beam correspondence or beam reciprocity does not hold) may be performed in a variety of cases for DL and UL transmission. For example, in a DL transmission scenario, a WTRU may not decode a DL signal successfully when one or more current beams (e.g., all current beams) are no longer good (e.g., quality of the beams are below a threshold). The degradation of the beam quality may be due to WTRU movement, blockage and rotation, etc. Beam switching for DL transmission may be initiated as illustrated in one or more of the following example cases.

In examples (e.g., when a WTRU experiences rotations), a WTRU Rx beam may be switched while a TRP Tx beam may be maintained. In these examples, beam associations or BPLS may no longer be suitable due to loss of association of current WTRU Tx or Rx beams. TRP Tx or Rx beams may be still suitable. A WTRU may switch its Rx beam and Tx beams while a TRP may maintain its Tx or Rx beams.

A WTRU may perform Rx beam switching or sweeping in order to receive and decode a DL signal from a TRP successfully. A WTRU may try one or more candidate Rx beams or all Rx beams, e.g., by switching to other Rx beams. A WTRU may try one or more candidate Rx beams first and continue to try the remaining Rx beams if the candidate Rx beams are good (e.g., if the quality of the candidate Rx beams are above a threshold).

In examples, both TRP Tx and WTRU Rx beams may be switched. The switching may be performed with or without loss of beam association or BPLS. In the former case, a WTRU may be experiencing movements, e.g., a BPLS may be out of date due to the loss of beam association of a current TRP Tx and WTRU Rx beams. In the latter case, a WTRU may be experiencing blockage, e.g., part of a BPLS may be still available for beam switching for the next transmission, but the current TRP Tx and/or WTRU Rx beams may be blocked.

When beam association is lost, a WTRU may (e.g., when the WTRU may not successfully decode a DL signal) perform Rx beam sweeping and/or beam switching in order to successfully receive and decode DL signals from a TRP. A WTRU may try one or more (e.g., all) candidate Rx beams or one or more (e.g., all) of the WTRU's Rx beams, e.g., by switching to other Rx beams to enhance the WTRU's reception capability for DL signals. The TRP may try one or more (e.g., all) candidate Tx beams or one or more (e.g., all) of the TRP's Tx beams, e.g., by switching to other Tx beams to enhance the TRP's transmission capability for DL signals.

When beam association is not lost, a WTRU may (e.g., when the WTRU may not successfully decode a DL signal) switch an Rx beam within the beam association in order to successfully receive and decode DL signals from a TRP. The WTRU may try one or more candidate Rx beams, e.g., by switching to other Rx beams within the beam association. The WTRU may inform (e.g., indicate to) a TRP which WTRU Rx beam(s) the WTRU may switch to, so that the TRP may determine which Tx beam(s) the TRP may switch to (e.g., based on the beam association or BPLS).

In examples, a TRP Tx beam may be switched while a WTRU Rx beam may remain the same. This technique may be employed in various situations including, for example, when a WTRU experiences movements, when a WTRU has a larger Rx beam width than a TPR's Tx beam width, and/or the like. A WTRU may (e.g., when the WTRU still cannot successfully decode a DL signal) initiate TRP Tx beam sweeping and/or switching when a current TRP Tx beam is no longer suitable for the WTRU's candidate Rx beams.

In examples (e.g., in UL transmission scenarios), a WTRU may initiate beam switching in order to complete an UL transmission to a TRP. For example, a WTRU may initiate beam switching when a TRP is unable to decode a UL signal from the WTRU, e.g., due to beam quality degradation. Beam switching for UL transmission may be initiated as illustrated in the following cases. In examples (e.g., when beam quality degradation is caused by a WTRU experiencing rotations and/or when beam quality degradation is caused by a beam association or BPLS becoming unsuitable), a WTRU Tx beam may be switched while a TRP Rx beam may be maintained. This may be because, even though current WTRU Tx or Rx beams may no longer be suitable, TRP Tx or Rx beams may still be satisfactory (e.g., quality of the TRP Tx or Rx beams are above a threshold).

In examples, both WTRU Tx beam(s) and TRP Rx beam(s) may be switched. The TRP Rx and WTRU Tx beam switching may occur with or without loss of beam association or BPLS. The TRP Rx and WTRU Tx beam switching may occur with loss of beam association when the switching is caused by WTRU movements. When a beam association of current TRP Rx and WTRU Tx beams is lost, a BPLS may become out of date. The TRP Rx and WTRU Tx beam switching may occur without loss of beam association or BPLS when the switching is caused by WTRU blockage. This may be because even though current TRP Rx and/or WTRU Tx beams may be blocked, part of the BPLS may still be available for beam switching for a next transmission.

In examples, a TRP Rx beam may be switched while a WTRU Tx beam may be maintained. This may occur, for example, when a WTRU experiences movements or when a WTRU has a larger Tx beam width than a TRP's Rx beam width.

One or more of the example beam switching scenarios described herein may be applicable to both DL and UL transmission. For example, a good beam pair obtained from DL beam sweeping may also be used in UL, e.g., when a Tx/Rx beam correspondence holds at both a TRP and a WTRU.

Figure 3:
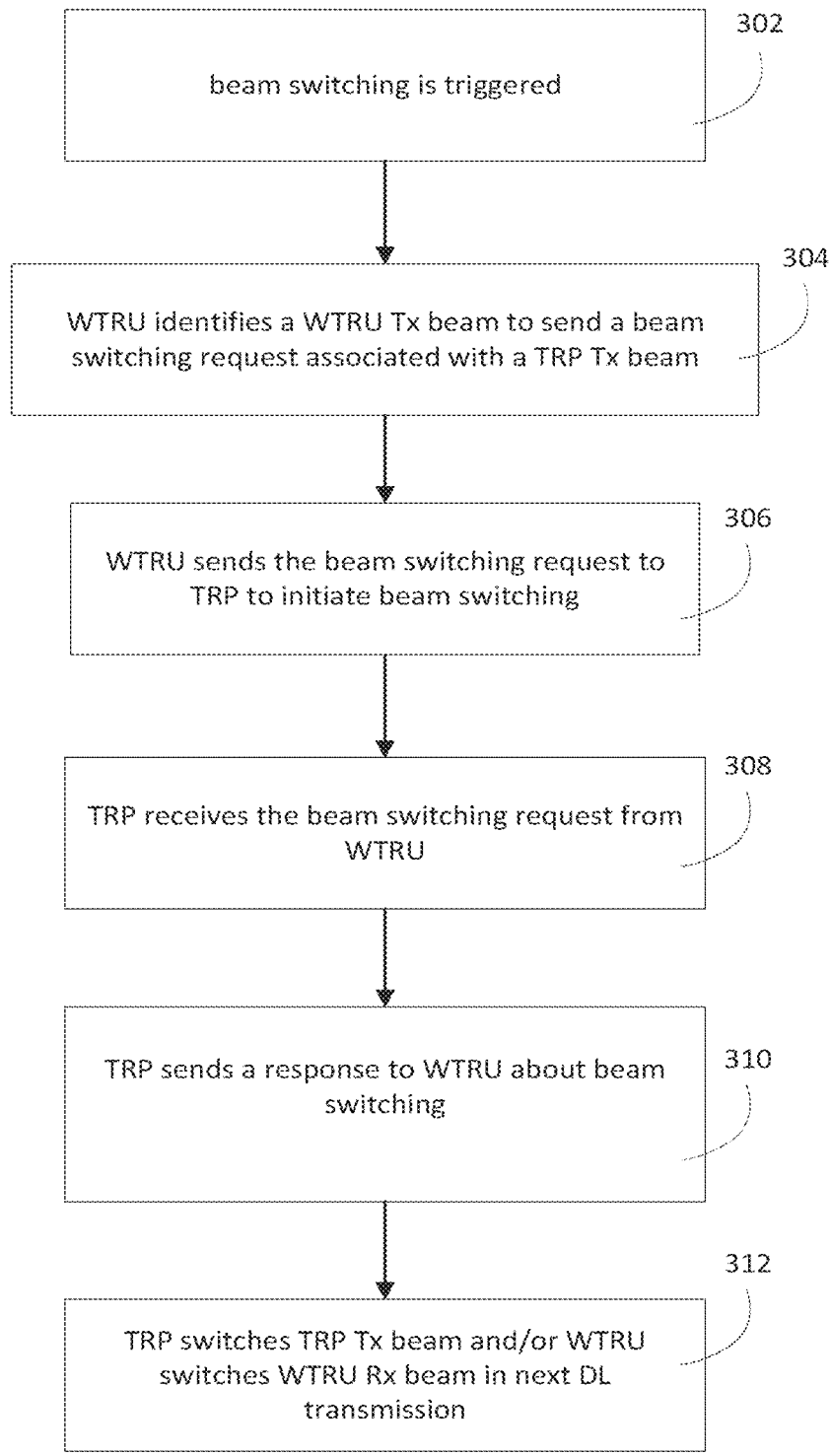
FIG. 3 is a diagram illustrating an example of WTRU-initiated beam recovery (e.g., beam switching) in downlink (DL).

FIG. 3 is a flow diagram illustrating an example of WTRU-initiated beam recovery (e.g., beam switching) in a downlink. Such beam switching may be initiated by a WTRU to achieve beam recovery. As such, the example techniques illustrated herein may generally apply to beam recovery operations including beam sweeping and beam switching. WTRU-initiated beam failure recovery may be performed via one or more of the following. At 302, beam switching may be triggered. The triggering may be based on one or more measurements or statistics associated with one or more current beams. The triggering may be based on one or more measurements or statistics associated with one or more beam pair links. The triggering may be based on other conditions described herein (e.g., all serving beams have failed). At 304, a WTRU may identify a WTRU Tx beam for sending a beam switching request associated with a TRP Tx beam. The WTRU Tx beam may be identified from a known UL beam pair link set or through UL beam sweeping such as U1 and/or U3. At 306, the WTRU may send the beam switching request to a TRP to initiate beam switching. The beam switching request may include a recommendation from the WTRU for a TRP Tx beam. At 308, the TRP may receive the beam switching request from the WTRU. At 310, the TRP may send a response to the WTRU, which may include an indication about the beam switching request. The indication may confirm, reject, or override the beam switching request/recommendation from the WTRU. The indication may be transmitted by one or more procedures described herein. At 312, the TRP may switch a Tx beam and/or the WTRU may switch an Rx beam, e.g., in a next DL transmission.

A beam recovery request such as a beam switching request or a beam sweeping request may be triggered by one or more conditions (e.g., measurements or statistics about a current beam or a beam pair link). These conditions may indicate a beam failure and prompt a WTRU to determine, initiate, and/or transmit a beam recovery request signal. One example condition may be that the quality of a current serving beam (e.g., a beam pair link) for a downlink control channel monitored by a WTRU (e.g., a new radio physical downlink control channel or NR-PDCCH) has fallen below a threshold. Another example condition may be that a WTRU has identified alternative beam candidates (e.g., new beam pair links) that satisfy certain beam quality requirements (e.g., beam quality is above a threshold). Another example condition may be that a WTRU has been configured with a beam common NR-PDCCH search space (e.g., fall back search space) to monitor. When a beam failure condition occurs, a WTRU may not be able to receive downlink control information (e.g., the WTRU's serving BPLs may be out of coverage). A fallback transmission scheme or mode may be introduced and used during beam recovery (e.g., to maintain connectivity and/or to reduce latency). A time window (e.g., one or more subframes) may be configured for the fallback operation. A common search space may be associated with one or more (e.g., all) serving beams so that the WTRU may still receive DCI, e.g., via at least one of the beams, in the time window.

Triggering conditions for a beam failure recovery request, e.g., to be sent by a WTRU, may be pre-defined, pre-specified, and/or configured by a network entity (e.g., a base station such as a gNB). The definition, specification and/or configuration may be based on a WTRU's capability. For example, a first triggering condition may be that one or more (e.g., all) serving beams or a beam-pair links associated with an NR-PDCCH monitored by the WTRU have failed (e.g., the respective qualities of all serving beams have fallen below a threshold). The beam quality may be measured by the WTRU using at least one of a reference signal (e.g., a CSI-RS) or a synchronization signal block (SSB). The reference signal or SSB may be associated with a demodulation reference signal (DM-RS) for the monitored NR-PDCCH via quasi-collocation (QCL). This may be referred to herein as the reference signal or SSB being QCL-ed with the DM-RS. A second triggering condition may be that a WTRU has identified a new beam candidate or a new beam-pair link candidate that has a beam quality above a threshold (e.g., a predefined or configured threshold). The beam quality may be determined based on L1 reference signal received power (L1-RSRP) associated with CSI-RS and/or SSB, for example. A third triggering condition may be that a WTRU has failed to determine a suitable beam candidate or beam-pair link candidate. A fourth triggering condition may be that a beam common NR-PDCCH has been configured. The beam common NR-PDCCH may be referred to as a fall-back NR-PDCCH, an NR-PDCCH associated with all beams, and/or an NR-PDCCH with Omni-direction beams. The NR-PDCCH may be associated with a common search space, which may in turn be associated with one or more configured SSBs. A fifth triggering condition may be that a WTRU has beam correspondence capabilities. A sixth triggering condition may be that a WTRU lacks beam correspondence capabilities.

A beam recovery request may be triggered by one or more of the conditions described herein (e.g., a combination of the conditions). The combination of triggering conditions may be pre-defined, pre-specified, and/or configured, e.g., by a network entity such as a gNB. For example, the combination of conditions may include the first and second example conditions described above, the first and fourth example conditions described above, the first, fourth, and sixth example conditions described above, etc.

A WTRU may take the same action or may take different actions based on different combinations of conditions being satisfied. For example, if the first and second example conditions described above are satisfied, a WTRU may send a beam recovery request in an uplink signal (e.g., a PRACH signal or a PUCCH signal). Such an uplink signal may be associated with a candidate beam identified or determined by the WTRU to resolve a beam failure. If the first and fourth example conditions described above are satisfied, a WTRU may send a beam recovery request in an uplink signal (e.g., a PRACH signal or a PUCCH signal), and the uplink signal may not be beam-specific (e.g., the signal may be associated with all beams). If the first and third example conditions described above are satisfied, a WTRU may report (e.g., by sending a signal) the beam failure to a higher layer and the WTRU may not send a beam recovery request. If the first and third example conditions described above are satisfied, a WTRU may perform an initial cell search. A WTRU may request a sub-time unit (Sub-TU) based fast beam sweeping or a regular time unit based beam sweeping to find one or more candidate beams (e.g., before sending a beam recovery request indicating the candidate beams). If the first and third example conditions described above are satisfied, a WTRU may send a beam recovery request with a default candidate beam. Such a default candidate beam may be pre-defined or configured.

An uplink channel (e.g., one or more signals transmitted on the uplink channel) may be used to submit a beam recovery request when a beam failure is detected. The beam failure may be detected if one or more of the triggering conditions describe above are met. The uplink channel or uplink resources for transmitting the beam recovery request may be selected as follows. A beam recovery request signal may be transmitted using one or more uplink resources (e.g., each of the uplink resources may be associated with a beam). For example, a number (e.g., Nb) of uplink resources may be configured for beam recovery request signal transmission. Each uplink resource may be associated with a downlink reference signal or a SS block. A WTRU may transmit a beam recovery request signal using the number of uplink resources. The beam used to transmit a beam recovery request may correspond to the Rx beam associated with the reference signal or SS block. The uplink resources used to transmit a beam recovery request signal may include a PRACH resource and/or a PUCCH resource (e.g., at least one of a PRACH resource or a PUCCH resource). The uplink resources may include a combination of PRACH resources and/or PUCCH resources.

A WTRU may transmit a beam recovery request using one uplink resource at a time and may wait for/monitor a response from an network entity (e.g., a base station such as a gNB) corresponding to the beam recovery request. A WTRU may monitor the PDCCH (e.g., the WTRU may assume that a corresponding PDCCH DM-RS is spatial QCL'ed with the RS of one or more candidate beams identified or recommended by the WTRU). A WTRU may transmit a beam recovery request over multiple (e.g., all) uplink resources configured for such purposes and wait for/monitor a response from an network entity. Each of the uplink resources may be associated with an NR-PDCCH, and the WTRU may monitor one or more (e.g., all) NR-PDCCH's for a response. The WTRU may report or indicate to a higher layer if the WTRU does not receive a response within a time window.

The uplink resource(s) used to transmit a beam recovery request may be configured for one or more serving beams for which a beam failure was detected and/or declared. The uplink resource(s) for a current serving beam may be used if the WTRU has no beam correspondence capability (e.g., under the sixth example condition described above). If the WTRU has beam correspondence capabilities, other uplink resource(s) configured for beam recovery request purposes may be used. The uplink resource(s) for current serving beam(s) may include one or more uplink resources configured for uplink control information signalling.

Figure 4:
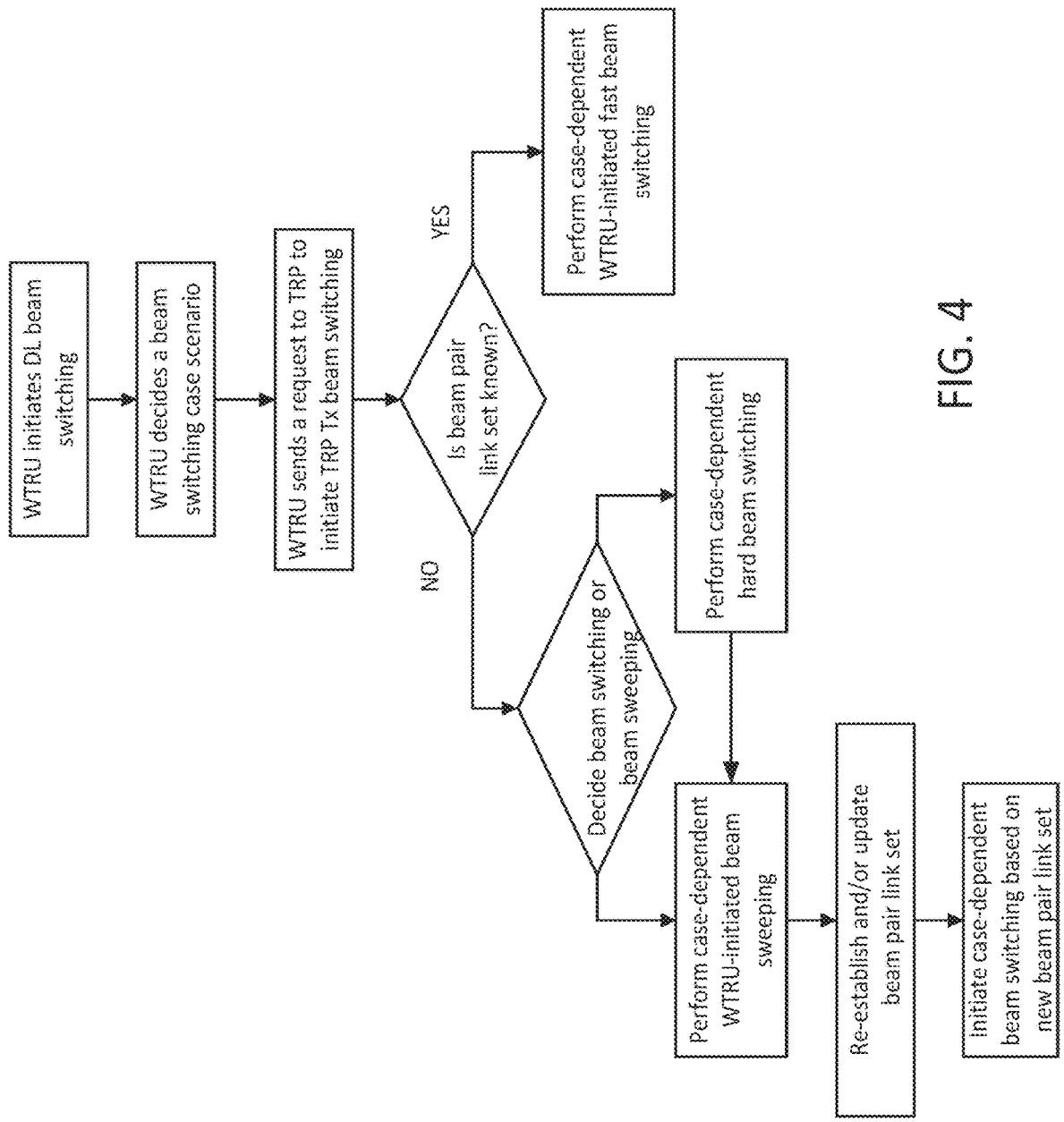
FIG. 4 is a diagram illustrating an example of case-dependent WTRU-initiated beam switching and beam sweeping in DL.

WTRU-initiated beam recovery (e.g., beam switching and/or beam sweeping) may be case-dependent. A WTRU may identify and/or indicate a candidate beam or beam pair link (e.g., an alternative beam or beam pair link) for a TRP and/or WTRU to switch to. The WTRU may determine the candidate beam or beam-pair link based on the beam quality of the candidate being above a threshold. The beam quality may be determined based on reference signal, for example. A WTRU may initiate a request for beam sweeping, for example, when beam association, beam pairing, and/or a beam pair link set is unavailable or unknown, or needs to be updated. FIG. 4 is a diagram illustrating an example of case-dependent WTRU-initiated beam switching and beam sweeping in the downlink.

Beam association and/or beam pairing may become outdated. A beam pair link set (BPLS) may become unknown. A WTRU may initiate case-dependent beam switching and beam sweeping as illustrated below.

In examples (e.g., when beam association is still valid), WTRU-initiated fast beam switching may be performed. A WTRU may perform beam switching on a WTRU Rx beam (e.g., only on the WTRU Rx beam) based on a BPLS. A WTRU may initiate beam switching on a TRP Tx beam (only on the TRP Tx beam) based on a BPLS. A WTRU may initiate beam switching on both a TRP Tx beam and a WTRU Rx beam based on a BPLS.

In examples (e.g., when beam association and/or BPLS is no longer valid), WTRU-initiated beam sweeping may be performed followed by WTRU-initiated beam switching. A WTRU may perform beam sweeping only for WTRU Rx beam(s), for both TRP Tx and WTRU Tx beams, or only for TRP Tx beam(s). In the case of WTRU Rx only beam sweeping and beam switching, a WTRU may request to initiate a full, coarse, or omni (e.g., 360-degree) beam sweeping procedure (e.g., referred to as P1 herein) to find or select a WTRU Rx beam. The selection of the WTRU Rx beam may be based on the selection of TRP Tx beams and/or WTRU Rx beam(s) from P1. Additionally or alternatively, the selection of the WTRU Rx beam may be based on a potentially directional or fine beam sweeping procedure (e.g., referred to as P3 herein) for measurement and reporting. The selection of the WTRU Rx beam may be refined via the beam sweeping procedure P3. A beam pair link set may be re-established and/or updated. WTRU Rx beam switching may be initiated based on a new beam pair link set.

In the case of beam sweeping and beam switching for both TRP Tx and WTRU Rx, a WTRU may request to initiate a full, omni, or coarse beam sweeping procedure (e.g., P1) to find or select the TRP Tx and WTRU Rx beam(s). Additionally or alternatively, a WTRU may request to initiate a fine beam sweep procedure (e.g., P2 or P3) for measurement and reporting (e.g., to refine the selection of TRP Tx and WTRU Rx beam(s) from P2 and P3). A beam pair link set may be re-established and/or updated. TRP Tx and WTRU Rx beam switching may be initiated based on a new beam pair link set.

In the case of TRP Tx only beam sweeping and beam switching, a WTRU may request to initiate a TRP Tx beam only full or omni beam sweeping procedure (e.g., P1) to find or select a TRP Tx beam based on the selection of TRP Tx beams and/or WTRU Rx beam(s) from P1. Additionally or alternatively, a WTRU may request to initiate a potentially directional or fine procedure (e.g., P2) for measurement and reporting (e.g., to refine the selection of WTRU Rx beam(s) if the WTRU uses beamforming from P2). A beam pair link set may be re-established and/or updated. TRP Tx beam switching may be initiated based on a new beam pair link set.

In examples (e.g., when the status of beam association may be unknown), hard beam switching may be performed. If hard beam switching does not work and a WTRU still cannot decode DL signal, the WTRU may perform beam sweeping and/or beam switching as if beam association and/or BPLS are not satisfactory. Hard beam switching may be performed via one or more of full beam switching, adjacent beam switching, or beam switching based on a prior-BPLS. Hard beam switching may be performed in a case dependent manner, as illustrated below.

A WTRU may initiate a WTRU Rx beam only fast beam switching. A WTRU may initiate fast beam switching for both a TRP Tx beam and a WTRU Rx beam. A WTRU may initiate a TRP Tx beam only fast beam switching. One or more of these techniques may be applied to improve DL signal reception, for example.

Case-dependent WTRU-initiated beam recovery (e.g., beam switching and/or beam sweeping) may be performed as follows. WTRU-initiated beam recovery may be triggered, for example, by a beam quality degradation event. A WTRU may determine the type of beam recovery (e.g., beam switching) to be performed, e.g., TRP Tx only, TRP Tx and WTRU Rx, or WTRU Rx only. A WTRU may (e.g., when beam association or a beam pair link set is known) switch a current WTRU Rx beam and inform a TRP to switch its current Tx beam. The beam switching may be performed as case-dependent WTRU initiated fast beam switching, as described herein. A WTRU may (e.g., when beam association or a beam pair link set is unknown) perform case-dependent WTRU-initiated beam sweeping or case-dependent WTRU-initiated hard beam switching, as described herein. The WTRU may determine the type of beam recovery to be performed based on a latency requirement, based on beam configurations (e.g., a number of beams to be swept), based on beam sweeping capabilities (e.g., when fast beam sweeping such as sub-time unit beam sweeping may be performed), etc.

A WTRU may perform WTRU-initiated beam sweeping for measurement and reporting purposes, to update a DL beam association or BPLS, and/or the like. Beam association or BPLS may be re-established and/or updated. A WTRU may use a new Rx beam for reception based on a new BPLS. A TRP may use a new Tx beam for transmission based on a new BPLS. A WTRU may perform hard beam switching when full beam sweeping cannot be performed due to latency concerns. A WTRU may perform WTRU-initiated beam sweeping to update beam association and may perform beam switching when the WTRU still cannot decode DL transmission by hard beam switching.

A WTRU may indicate beam recovery (e.g., beam switching) to a TRP in a beam recovery request. A WTRU may (e.g., when a TRP Rx beam may be known) send an indication to the TRP regarding an alternative beam or beam pair link to switch to for the next DL transmission. The alternative beam or beam pair link may be identified by the WTRU, as described herein. The alternative beam or beam pair link may include a WTRU Rx beam, a TRP Tx beam, or both a WTRU Rx beam and a TRP Tx beam. The TRP and/or WTRU may switch to the alternative beam or beam pair link after a certain time period subsequent to receiving and/or transmitting the beam recovery request. The time period may include a number of TTIs or OFDM symbols. The time period may be pre-defined, configured, and/or dynamically signalled. The TRP may begin using a new TRP Tx beam (e.g., as recommended by the WTRU) and the WTRU may beginning using a new WTRU Rx beam for the next DL signal.

A WTRU may (e.g., when a TRP Rx beam is unknown) send a beam recovery request (e.g., which may include an indication for an alternative beam or beam pair link) multiple times using the same WTRU Tx beam or different WTRU Tx beams. A TRP may try different TRP Rx beams to receive the beam recovery request. This may be accomplished by a UL beam management procedure such as U1, U2 and/or U3.

A WTRU may (e.g., when beam reciprocity or beam correspondence is present) send a beam recovery request (e.g., which may include a beam switching indication) via an alternative Tx beam that the WTRU may have identified as a candidate for beam switching. Such an alternative WTRU Tx beam may be associated with a corresponding alternative WTRU Rx beam. A TRP may sweep its Rx beams to try to receive the request from the WTRU. Using this mechanism, a beam recovery request may be provided implicitly because when the TRP receives the request from the WTRU at a TRP Rx beam, the TRP may infer the WTRU Tx beam based on a UL beam pairing link set. A corresponding WTRU Rx beam may then be derived, assuming beam reciprocity holds at the WTRU. For the case where the WTRU Rx beam is derived, a TRP Tx beam may be determined based on the WTRU Rx beam, e.g., based on a DL beam pairing link set.

When a WTRU indicates its beam reciprocity to a TRP and UL/DL beam pair link sets are known, beam switching may be referred to as WTRU-assisted beam switching. When beam reciprocity holds at both a WTRU and a TRP, UL and DL beam pair link sets may be the same. In that case, WTRU-assisted beam switching may be implemented as long as the beam reciprocity of the WTRU and one of the UL and DL beam pair link sets are known. The content of a UL signal may serve as an indication of beam reciprocity.

Figure 5:
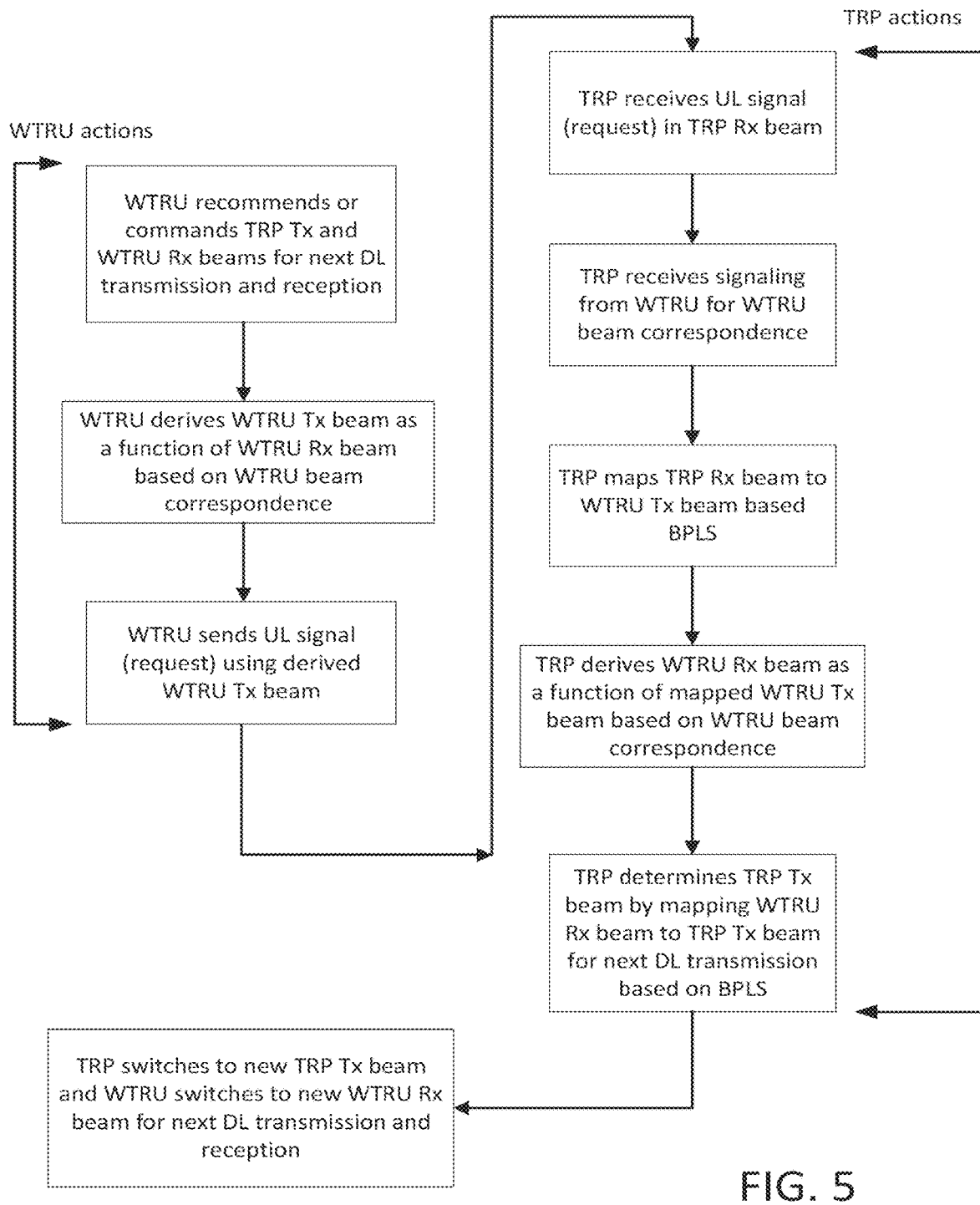
FIG. 5 is a diagram illustrating an example of WTRU-indicated beam-switching using a beam pair link set and WTRU beam correspondence.

FIG. 5 is a diagram illustrating an example of WTRU-indicated beam switching using a beam pair link set and WTRU beam correspondence.

A WTRU may send a request for beam sweeping. Such a request may be sent when an association for a Tx/Rx beam is lost or needs to be updated, for example. A UL signal may be sent as a beam sweeping request. The UL signal may indicate the type of beam sweeping to be performed, e.g., time unit-based or sub-time unit based. The UL signal may indicate whether TRP-oriented or WTRU-oriented beam sweeping should be performed. DL beam sweeping may establish an association between a TRP Tx beam and a WTRU Rx beam. UL beam sweeping may establish an association between a TRP Rx beam and a WTRU Tx beam. (UL, DL) association may be maintained and updated (e.g., via WTRU-initiated beam sweeping).

Figure 6:
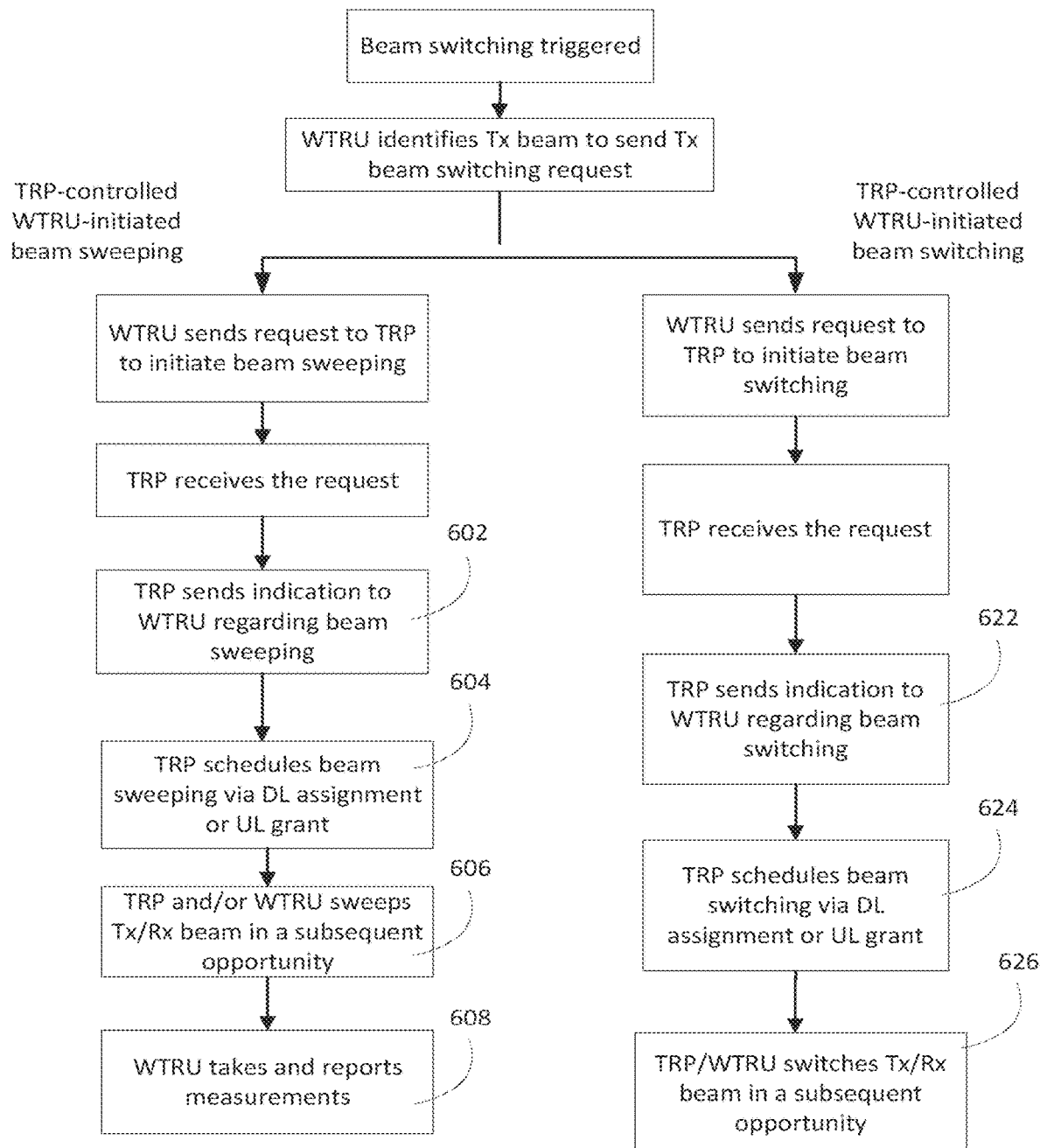
FIG. 6 is a diagram illustrating an example of TRP-controlled, WTRU-initiated beam sweeping/switching in DL.
Figure 7:
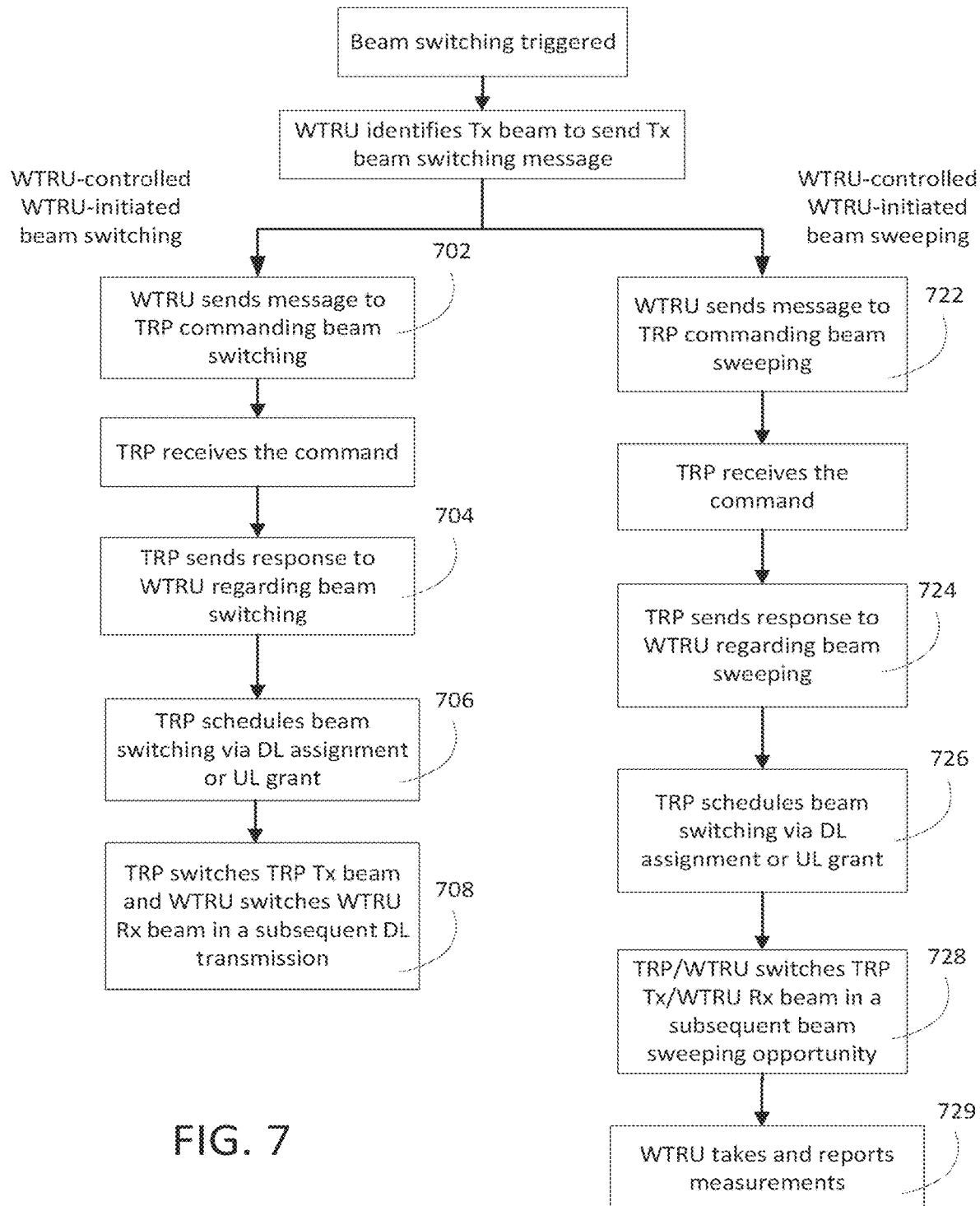
FIG. 7 is a diagram illustrating an example of WTRU-controlled, WTRU-initiated beam sweeping/switching in DL.

A request message sent by a WTRU to an network entity (e.g., a TRP) may indicate to the network entity that the WTRU intends to initiate beam recovery, such as beam switching and/or beam sweeping. The REQUEST message may include one or more of the following. The REQUEST message may include an indication of whether the WTRU-initiated beam sweeping and/or switching request is TRP-controlled or WTRU-controlled (e.g., as shown in FIGS. 6 and 7). The REQUEST message may include an indication of whether the request is for beam-sweeping or for beam switching. The REQUEST message may include an indication of whether the request is for TU-based or STU-based beam sweeping. The REQUEST message may include an indication of a number of sub-time units per time unit (e.g., for STU-based beam sweeping). The REQUEST message may include an indication of a number of time units per beam sweeping. The REQUEST message may include an indication of a beam switching/sweeping procedure used (e.g., whether it is P1, P2 or P3). The REQUEST message may include an indication of whether U1, U2 and/or U3 is used. The REQUEST message may include an indication of whether the requested beam switching or sweeping is TRP-oriented or WTRU-oriented (e.g., for P1 or U1).

FIG. 6 is a diagram illustrating an example of TRP-controlled, WTRU-initiated beam sweeping/switching in the downlink. At 602 and 622, a TRP may, upon receiving a beam sweeping or switching request from a WTRU, send a response (e.g., an indication) to the WTRU regarding the requested beam sweeping or switching. The response may indicate whether the request is confirmed or overridden. The response may indicate whether the sweeping and/or switching is based on time units or sub-time units, the number of repetitions involved, etc. At 604 and 624, the TRP may schedule the requested beam sweeping or switching via a DL assignment or a UL grant. At 606 and 626, the TRP may sweep/switch TRP Tx beams and/or a WTRU may sweep/switch WTRU Rx beams in a subsequent beam sweeping opportunity. The opportunity may be scheduled or pre-defined. At 608, the TRP may take and report measurements in response to the beam sweeping request.

FIG. 7 is a diagram illustrating an example of WTRU-controlled, WTRU-initiated beam sweeping/switching in DL. At 702 and 722, a WTRU may send a message to a TRP commanding the TRP to perform beam switching or sweeping. The message may indicate whether the beam switching or sweeping is based on time units or sub-time units, the number of repetitions involved, etc. At 704 and 724, the TRP may send a response to the WTRU regarding the beam switching or sweeping. The response may be an acknowledgment of the beam switching or sweeping command, for example. At 706 and 726, the TRP may schedule the beam switching or sweeping via a DL assignment or a UL grant. At 708 and 728, the TRP and/or the WTRU may switch/sweep a WTRU Tx beam and/or a TRP Tx beam in a subsequent opportunity. The opportunity may be scheduled or predefined. If the command is a beam sweeping command, the TRP may take and report measurements at 729.

When a WTRU is unable to decode a DL signal, the WTRU may transmit a beam switching request to a TRP if beam association is good or partially good. If beam association is no longer good, the WTRU may send a beam sweeping request to the TRP. A WTRU may identify a WTRU Tx beam and/or a TRP Rx beam for transmitting and/or receiving a beam recovery request and may initiate beam recovery upon finding the suitable beam(s).

A WTRU may transmit a beam recovery request to a network entity (e.g., a TRP) to inform or indicate to the network entity that beam switching and/or beam sweeping may be performed at the WTRU and/or the network entity. The WTRU may transmit the request using a WTRU Tx beam that may be configured by a network. The WTRU Tx beam may be selected from candidate Tx beams identified through a recent beam sweeping operation. The network may store these WTRU Tx beams, e.g., for beam management purposes. A TRP Rx beams for receiving the beam recovery request may be selected from candidate Rx beams identified through a recent beam sweeping operation. Associations between WTRU Tx beams and TRP Rx beams may be established, updated and/or stored at a TRP and/or a network. RRC may configure beam associations or a subset of beam associations for WTRU Tx beams and TRP Rx beams. A network entity (e.g., a TRP) may indicate to a WTRU one or more UL links for the WTRU to send a beam recovery request or indication. Such UL link(s) may include, for example, an association of a WTRU Tx beam and a TRP Rx beam as a link or a beam pair.

A WTRU may autonomously try one or more (e.g., all) UL links or beam pair associations for sending a beam recovery (e.g., beam switching or beam sweeping) request. A WTRU may start with a best beam or link to the WTRU's knowledge. A WTRU may request or require a network entity (e.g., a TRP) to perform Rx beam sweeping when the network entity does not indicate a beam or link for the WTRU to send a beam recovery request. The network entity may perform Rx beam sweeping among multiple candidate Rx beams that the entity has knowledge about. One reason for this is that the network entity may not know exactly on which Rx beam a UL signal from the WTRU may be received when the WTRU may autonomously transmit the signal using one of multiple UL links or beams.

A WTRU may autonomously transmit a beam recovery request using all of the WTRU's Tx beams. An network entity (e.g., a TRP) may perform full Rx beam sweeping when a WTRU Tx beam used to transmit a beam recovery request is beyond a current beam association and/or a current candidate beam pair link set, and current candidate Rx beams at the network entity are not suitable for the WTRU Tx beam.

A WTRU may initiate a beam recovery request to a network entity (e.g., a TRP) based on one or more of the following. The WTRU may switch from a current Tx beam to an alternate Tx beam to send the beam recovery request. The WTRU may then wait for a response (e.g., an acknowledgment) from the network entity. A WTRU may switch from a current Tx beam to an alternate Tx beam to send a beam recovery request to a network entity and at the same time inform the network entity to switch its Rx beam according to a UL beam association in order to receive the request. A WTRU may switch from a current Tx beam to an alternate Tx beam to send a beam recovery request to a network entity. The network entity and/or the WTRU may then perform full beam sweeping at the network entity (e.g., for a Rx beam) and/or the WTRU (e.g., for a WTRU Tx beam) so that the beam recovery request may be received. A WTRU may initiate beam sweeping for measurement and/or reporting purposes (e.g., to update a UL beam association).

A scheduling request (SR) or NR-PUCCH may be used to transmit a beam recovery request such as a beam switching request. For example, NR-PUCCH may be used where a WTRU is capable of maintaining uplink timing synchronization with a network entity (e.g., TRP). A preamble (e.g., PRACH) may be used to transmit a beam recovery request (e.g., a beam switching or sweeping request) when timing synchronization may no longer be maintained. A WTRU may check its timing synchronization status (e.g., uplink timing synchronization status) and decide which one or more of the aforementioned techniques (e.g., resources) should be used. A beam recovery request (e.g., a beam switching or sweeping request) may be embedded in NR-PUSCH. The preamble described herein may include a PRACH preamble, a PRACH-like preamble (e.g., different parameters may be use for preamble sequences from a PRACH), and/or the like.

A WTRU may provide a recommendation for DL beam recovery such as DL beam switching. For example, a WTRU may identify (e.g., select from a list) a candidate DL beam and indicate the candidate DL beam to a network entity (e.g., a TRP). A WTRU may send a request signal to a TRP to switch TRP Tx beam. The WTRU may include an indication in the request regarding a suggested alternative or candidate TRP Tx beam for the next DL transmission. A WTRU may (e.g., partially) refresh a list of stored DL beams and may indicate the list to a network entity. A RRC controller may configure a DL beam association between a TRP Tx beam and a WTRU Rx beam. A WTRU may recommend multiple alternative beam(s) and/or beam link(s), e.g., to a network entity to select from in case the network entity may decide against a particular beam.

A WTRU may rank beam associations. The WTRU may suggest/indicate (e.g., in a beam recovery request) a candidate beam association to a network entity (e.g., a TRP) according to the ranking. In response to the suggestion/indication, the network entity may switch to a Tx beam in the suggested/indicated beam association to send a DL signal. The WTRU may receive the DL signal via a WTRU Rx beam according to the beam association.

A WTRU may recommend a beam that is not the next highest ranked on a candidate beam list. The WTRU may indicate to a network entity (e.g., a TRP) which TRP Tx beam should be used for a subsequent DL transmission. A WTRU Rx beam for receiving the subsequent DL transmission may be derived, e.g., based on beam association involving the indicated TRP Tx beam.

A WTRU may suggest or command the use of a Tx beam to a network entity explicitly or implicitly. An explicit suggestion or command may be provided as described herein. An implicit suggestion or command may be provided based on TRP/WTRU beam correspondence (e.g., when TRP/WTRU beam correspondence holds). A WTRU may use a beam index associated with a WTRU Tx beam to indicate or suggest a TRP Tx beam. The WTRU Tx beam may be selected based on an associated TRP Rx beam. The TRP Rx beam may correspond to the TRP Tx beam that the WTRU may prefer. The TRP/WTRU correspondence may be based on a function. A TRP may acquire knowledge of a WTRU's preference for a TRP Tx beam by performing TRP Rx beam sweeping to receive a relevant signal from the WTRU. Based on the signal, the TRP may determine (e.g., implicitly obtain) a TRP Tx beam for completing a subsequent DL transmission.

Figure 8:
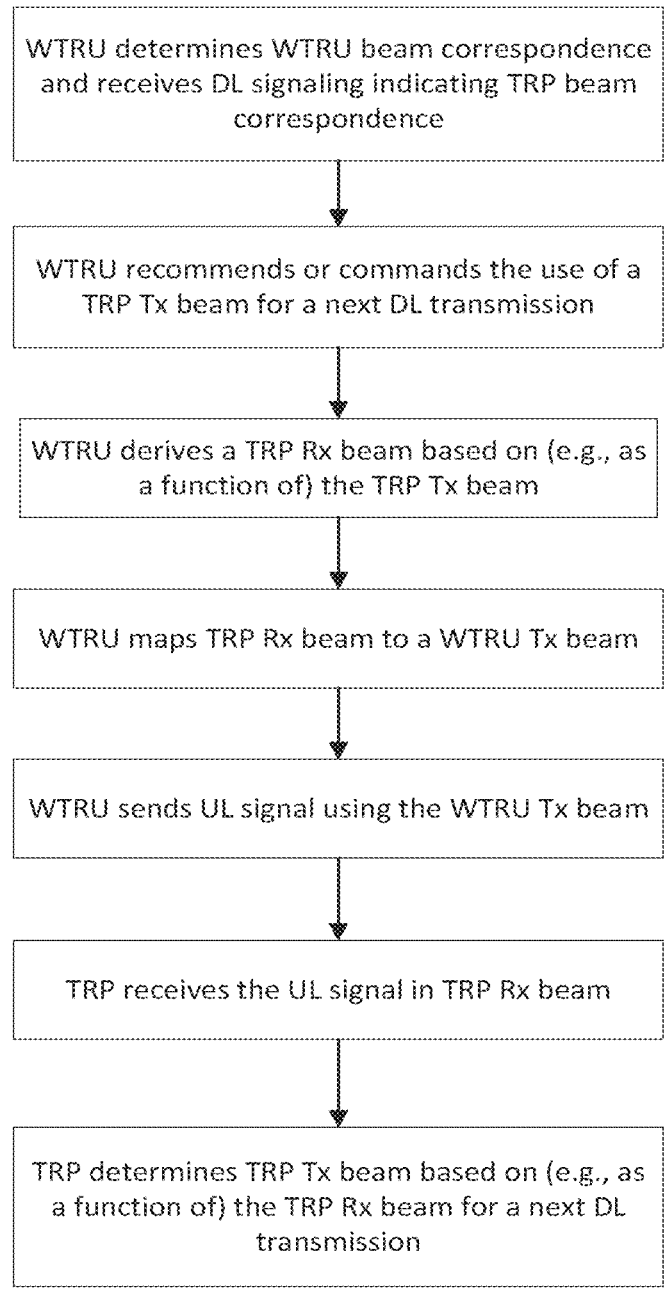
FIG. 8 is a diagram illustrating an example of a WTRU implicitly indicating a TRP Tx beam based on TRP/WTRU beam correspondence, e.g., for a next DL transmission.

FIG. 8 is a diagram illustrating an example of a WTRU implicitly indicating a TRP Tx beam based on TRP/WTRU beam correspondence, e.g., for a DL transmission (e.g., a next DL transmission).

Beam correspondence properties may be used to support and/or enable beam recovery such as beam switching. A WTRU may (e.g., when there is beam correspondence on both the WTRU and a TRP, and/or when beam association is satisfactory) determine a WTRU Tx beam based on a WTRU Rx beam. Such a WTRU Rx beam may be indicated by a TRP. For example, a TRP may have knowledge of which TRP Tx beam to use for a DL transmission. The TRP may derive a TRP Rx beam based on the TRP Tx beam and may use the derived TRP Rx beam to receive a signal from a WTRU. The TRP may send an indication (e.g., a single indication) to the WTRU regarding the use of a WTRU Rx beam and/or a WTRU Tx beam. A WTRU may transmit a signal via a WTRU Tx beam (e.g., beam #x) to a TRP. If beam #x corresponds to a TRP Rx beam (e.g., beam #y) based on a present beam correspondence, the transmission by the WTRU using beam #x may imply that the TRP should switch to TRP Tx beam #y for DL transmission and that the WTRU may expect to receive the DL transmission using WTRU Rx beam #x. Similar actions may be taken by a TRP to send and receive transmission from a WTRU.

Beam correspondence may be one-sided. When beam correspondence only holds for a WTRU, the WTRU may derive its Tx beam based on the Rx beam via which the WTRU receives a DL signal. The WTRU may use the derived WTRU Tx beam to send a UL transmission (e.g., a beam recovery request) to a TRP. The TRP may determine a TRP Rx beam for receiving the UL transmission based on an WTRU Tx-TRP Rx beam association. The TRP may perform beam switching and/or sweeping to receive the UL transmission if an Rx beam may not exist in an association.

When beam correspondence only holds for a TRP, a WTRU may receive a DL signal via a WTRU Rx beam and may determine a WTRU Tx beam for UL transmission without beam correspondence information. The WTRU may determine the WTRU Tx beam as follows. The WTRU may determine a TRP Rx beam based on the TRP Tx beam via which the DL signal is sent. The WTRU may then derive a WTRU Tx beam based on a WTRU TX-TRP Rx beam association. If a WTRU Tx beam does not exist in an association, the WTRU may perform Tx beam switching or sweeping in order to complete the UL transmission.

A network entity (e.g., a TRP) may respond to a WTRU beam recovery request (e.g., which may include a beam switching recommendation). The network entity may respond by confirming or overriding the recommendation. A confirmation may be performed by sending/receiving a DL signal via a TRP Tx beam/WTRU Rx beam that the WTRU may have recommended. A single bit or a single state may be used to indicate that a DL transmission includes a beam recovery confirmation message. Using a single bit or single state to indicate a confirmation message may reduce signalling overhead.

In a beam recovery response, a network entity may inform a WTRU to switch to a new link (e.g., a new TRP Tx beam and/or a WTRU Rx beam). The WTRU may receive the response using a current Rx beam, and may switch from the current Rx beam to a different Rx beam based on information included in the response. One or more bits or states may be used in the response to indicate which new beam(s) the TRP may have decided to use for DL transmission and/or which new beam(s) the WTRU may be expected to receive the DL transmission. The one or more bits or states may represent multiple beams or beam indices.

A beam confirmation message and a beam indication message may be sent separately or may be jointly encoded. Different states may be indicated in an jointly encoded beam confirmation and beam indication message. For example, a jointly encoded beam confirmation and beam indication message may use a bit "1" to indicate that a beam recovery recommendation is confirmed or a bit "0" to indicate that a beam recovery recommendation is not confirmed. A jointly encoded beam confirmation and beam indication message may include one or more of the following bit combinations. Bits "000" may represent state 0 or that beam index 0 should be used. Bits "001" may represent state 1 or that beam index 1 should be used. Bits "010" may represent state 2 or that beam index 3 should be used. Bits "011" may represent state 3 or that beam index 4 should be used. Bits "100" may represent state 4 or that beam index 5 should be used. Bits "101" may represent state 5 or that beam index 6 should be used. Bits "110" may represent state 6 or that beam index 7 should be used. Bits "111" may represent state 7 or that a recommendation by a WTRU is confirmed. In the case of confirmation, a TRP and/or a WTRU may assume that the same beam(s) recommended by the WTRU in a UL signal (e.g., a candidate beam recommended in a UL beam failure recovery request) should be used. In the case of another state being indicated (e.g., states 0-6), a TRP and/or a WTRU may assume that the beam(s) indicated by the state(s) should be used. For example, a WTRU may assume that beam #j should be used in response to state #being indicated.

An indication associated with beam switching in the downlink may be provided as follows. A TRP may transmit information (e.g., an indication) to a WTRU regarding a WTRU Rx beam for receiving a DL signal or channel. The WTRU Rx may be associated with a TRP Tx beam. A TRP may transmit information (e.g., an indication) to a WTRU about a WTRU Tx beam for transmitting a UL signal or channel. The WTRU Tx beam may be associated with a TRP Rx beam.

An indication for a WTRU Rx and/or a WTRU Tx beam may be provided as follows. The indication may be included in a response message from a network entity. The indication may be provided using one or more of a DL control resource, a DL data resource, and/or a reference signal (RS). For example, a DL RS may be used to indicate WTRU Rx beam for a current or subsequent DL signal or a DL channel (e.g., for DL control, DL data, and/or DL RS). A DL RS may be used to indicate WTRU Tx beam for a current or subsequent UL signal or UL channel (e.g., for UL control, UL data, and/or UL RS). An indication for WTRU Rx beam may inform the receiving WTRU about a WTRU Rx beam for receiving a current or subsequent DL signal or DL channel such as DL control, DL data, or DL RS. An indication for a WTRU Tx beam may inform the receiving WTRU about a WTRU Tx beam for transmitting a current or subsequent UL signal or UL channel such as UL control (e.g., NR-PUCCH or PUCCH), UL data, or UL RS (e.g., SRS). An indication for a WTRU Rx and/or a WTRU Tx beam may be based on search space, DCI, hybrid search space, hybrid control region, hybrid DCI, and/or the like.

An indication for a TRP Rx and/or a TRP Tx beam may be provided as follows. The indication may be included in a request message from a WTRU. The indication may be provided using one or more of a UL control resource, a UL data resource, an RS, and/or a WTRU request (e.g., a preamble, an orthogonal cover code (OCC), etc.). An indication for a TRP Rx beam may inform a TRP about a TRP Rx beam for receiving a current or subsequent UL signal or UL channel such as UL control, UL data, and/or UL RS. An indication for a TRP Tx beam may inform a TRP about a TRP Tx beam for transmitting a current or subsequent DL signal or DL channel such as DL control, DL data, and/or DL RS. An indication for a TRP Rx beam and/or a TRP Tx beam may be based on a control region, a control region segment, UCI, hybrid control region, hybrid control region segment, hybrid UCI, cyclic shift, and/or the like. The indication (e.g., when provided using a WTRU request preamble) may be based on a preamble set, a preamble subset, a hybrid preamble set, a hybrid preamble subset, and/or an OCC. An OCC may indicate a beam set or a beam subset. A preamble index or payload may indicate a beam within a beam set or a beam subset.

Control widebeam may be used to indicate a data narrow beam set or a data narrow beam subset. DCI may be used to indicate a data narrow beam within a beam set or a beam subset. Search space may be used to indicate a beam subset within an indicated beam set or subset.

A search space based beam indication may be implemented as follows. A network entity (e.g., a TRP) may use a search space (e.g., a control region) to indicate a WTRU Rx beam for receiving a DL signal or channel. The search space may comprise (e.g., be partitioned into) multiple search regions or search space segments. A (e.g., each) search region (e.g., a control resource set or CORESET) or search space segment may be associated with a WTRU Rx beam index. A WTRU may decode a DL control channel in a particular control region or search space segment. This may indicate that a WTRU Rx beam associated with the particular control region (e.g., on a per-CORESET basis) or search space segment may be used to receive a DL signal or channel. For example, a WTRU may decode a control channel in region #k or search space segment #k. This may indicate that WTRU Rx beam #k may be used for reception of a subsequent DL signal or channel.

A hybrid procedure may be used to provide a beam related indication. A TRP may use search space (e.g., a control region) in combination with control signalling (e.g., one or more explicit control signals or signalling bits) to indicate a WTRU Rx beam for receiving a DL transmission (e.g., DL signal or DL channel). The search space may comprise (e.g., be partitioned into) multiple regions or search space segments. A (e.g., each) search region or search space segment (e.g., including a control region such as CORESET) may be associated with a set of Rx beam indices. A WTRU may decode a control channel in a particular control region (e.g., on a per-CORESET basis) or search space segment. This may indicate that the WTRU Rx beam set associated with the control region or search space segment may be used to receive a subsequent DL signal or channel.

One or more explicit signals (e.g., indication bits) may be inserted in downlink control information (DCI) or a medium access control (MAC) control element (CE) to indicate a particular WTRU Rx beam within an indicated set of WTRU Rx beams. For example, a WTRU may decode a control channel in control region #m or search space segment #m. This may indicate that WTRU Rx beam set #m may be used for reception of a current or subsequent DL signal or channel. A WTRU Rx beam within the WTRU Rx beam set #m that may be used for reception of a current or subsequent DL signal or channel may be indicated by n bits in DCI (e.g., n bits Transmission Configuration Indication (TCI) fields in DCI) or MAC CE. For example, $2^n$ beams may be selected out of a beam set m by MAC CE. The beams may be indicated by n bits TCI fields in DCI for DL data channel (e.g., PDSCH) reception. MAC CE may indicate (e.g., directly indicate) which Rx beam within a beam set m should be used for DL control channel (e.g., PDCCH) reception when the number of Rx beams within the beam set m is larger than 1.

Figure 9:
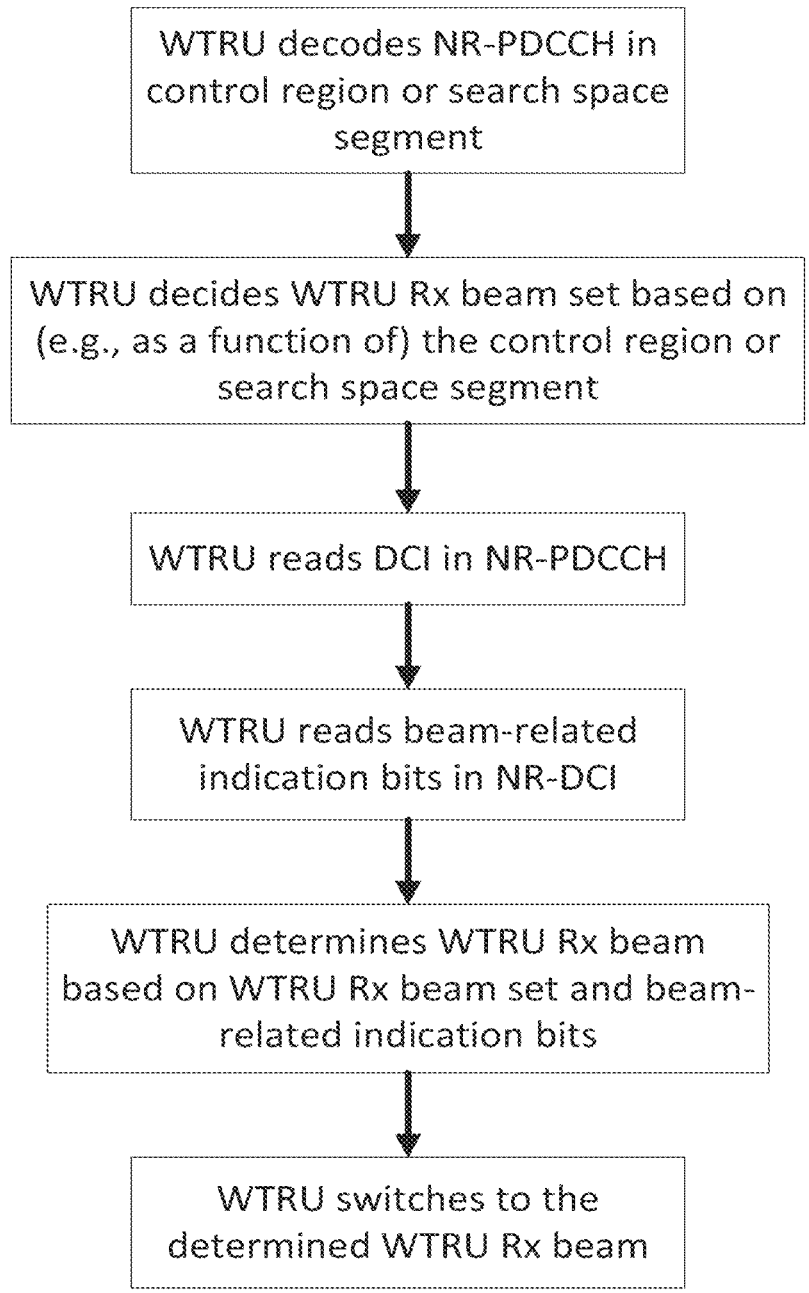
FIG. 9 is a diagram illustrating example operations that may take place at a WTRU to provide a beam-related indication in DL using a hybrid approach.

FIG. 9 is a diagram illustrating example operations that may take place at a WTRU to provide a beam related indication in the downlink using a hybrid approach. A WTRU may decode NR-PDCCH in a control region or search space segment. The WTRU may be configured by RRC to determine a WTRU Rx beam set based on (e.g., as a function of) the control region (e.g., on a per-CORESET basis) or the search space segment. The WTRU may read DCI (e.g., beam-related bits such as TCI fields in NR-DCI) in NR-PDCCH. The WTRU may determine a WTRU Rx beam among the WTRU Rx beam set based on information (e.g., beam-related bits) included in the DCI. The WTRU may switch to the determined WTRU Rx beam for DL data channel PDSCH reception.

Figure 10:
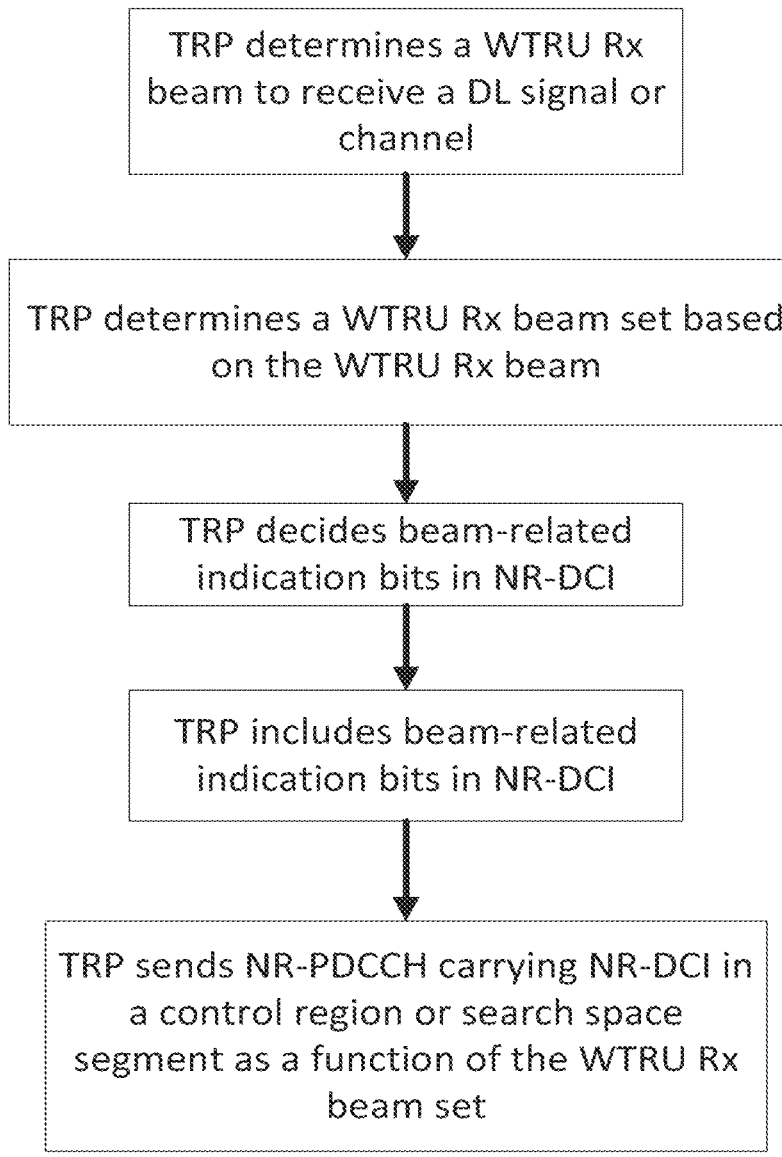
FIG. 10 is a diagram illustrating example operations that may take place at a TRP to provide a beam related indication in DL using a hybrid approach.

FIG. 10 is a diagram illustrating example operations that may take place at a TRP to provide a beam related indication in the downlink using a hybrid approach. A TRP may determine a WTRU Rx beam to receive a DL signal or channel. The TRP may configure the WTRU with the WTRU Rx beam (e.g., the TRP may indicate the WTRU Rx beam to the WTRU). The TRP may determine a WTRU Rx beam set based on the WTRU Rx beam. The TRP may determine beam related information to be included in DCI (e.g., one or more beam-related bits in NR-DCI). The TRP may send a NR-PDCCH carrying the DCI in a control region or search space segment. The control region or search space segment may be selected as a function of the WTRU Rx beam set, for example.

Figure 11:
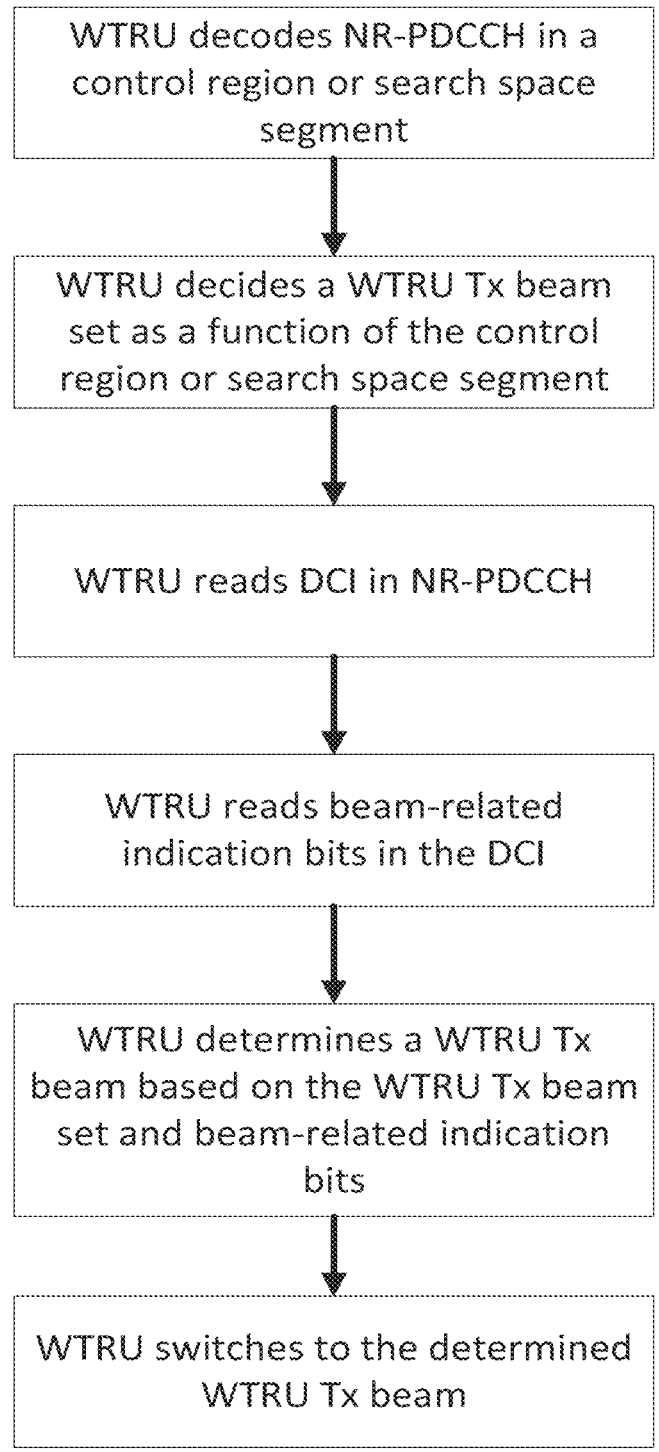
FIG. 11 is a diagram illustrating example operations that may take place at a WTRU to provide a beam related indication in UL.

FIG. 11 is a diagram illustrating example actions that may take place at a WTRU to provide a beam related indication in the uplink using a hybrid approach. A WTRU may decode NR-PDCCH in a control region or search space segment. The WTRU may be configured by RRC to determine a WTRU Tx beam set, e.g., as a function of the control region or search space segment. The WTRU may read DCI (e.g., beam-related indication bits in NR-DCI) in NR-PDCCH. The WTRU may determine a WTRU Tx beam among the WTRU Tx beam set based on the beam-related indication bits. The WTRU may switch to the determined WTRU Tx beam.

Figure 12:
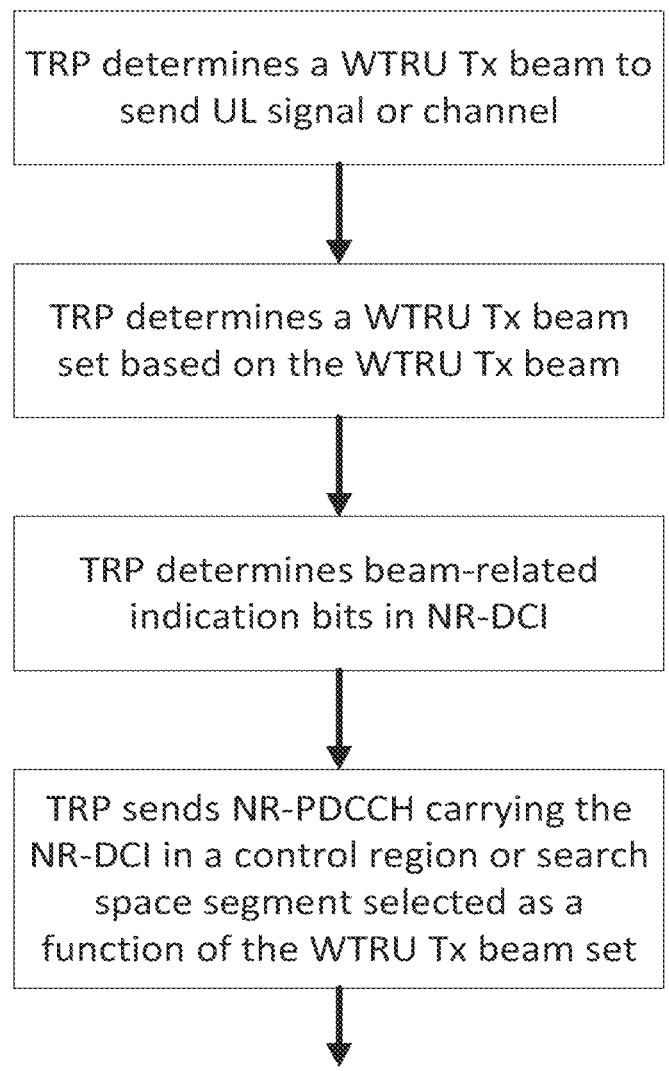
FIG. 12 is a diagram illustrating example operations that may take place at a TRP to provide a beam related indication in UL.

FIG. 12 is diagram illustrating example actions that may take place at a TRP to provide a beam related indication in the uplink using a hybrid approach. A TRP may determine a WTRU Tx beam to receive a DL signal or channel. The TRP may configure the WTRU with the WTRU Tx beam (e.g., the TRP may indicate the WTRU Tx beam to the WTRU). The TRP may determine a WTRU Tx beam set based on the WTRU Tx beam. The TRP may determine beam-related information to be included in DCI (e.g., one or more beam-related indication bits in NR-DCI). The TRP may send a NR-PDCCH carrying the DCI in a control region or search space segment. The control region or search space segment may be selected as a function of the WTRU Tx beam set.

A beam related indication may be provided by a TRP for receiving a DL control channel (e.g., PDCCH or NR-PDCCH) transmission via a WTRU Rx beam. The DL control channel transmission may be a current or subsequent DL control channel transmission. The TRP may use a previous control channel (e.g., NR-PDCCH or NR Enhanced Physical Downlink Control Channel (NR-ePDCCH)) to indicate the WTRU Rx beam. The TRP may embed information (e.g., embed beam indication bits and/or control bits in data, MAC CE, etc.) about the WTRU Rx beam in a NR-PDSCH. The TRP may use a beam reference signal (BRS), a mobility reference signal (MRS), and/or a demodulation reference signal (DMRS) that may precede a control channel to indicate the WTRU Rx beam for receiving the control channel.

A beam related indication may be provided by a TRP for receiving a DL data channel (e.g., NR-PDSCH or PDSCH) transmission via a WTRU Rx beam. The DL data channel transmission may be a current or a subsequent DL data channel transmission. The TRP may use a search space to indicate the WTRU Rx. The search space may be partitioned into multiple regions or search space segments. A (e.g., each) region or search space segment may be associated with an Rx beam index. A WTRU may decode a control channel in a particular region or search space segment. The WTRU may infer that a corresponding WTRU Rx beam associated with the control region or search space segment may be used to receive a subsequent DL data channel. For example, the WTRU may decode a control channel in region #k or a search space segment #k. Based on the decoding, the WTRU may infer that WTRU Rx beam #k may be used for reception of a subsequent DL data channel.

A TRP may use a previous or current control channel (e.g., NR-PDCCH or NR-ePDCCH) to indicate a WTRU Rx beam for receiving a current DL data channel transmission. The TRP may embed information (e.g., embed beam indication bits and/or control bits in data, MAC CE, etc.) about a WTRU Rx beam in a NR-PDSCH. The TRP may use a BRS, a MRS, and/or a DMRS that may precede a data channel to indicate a WTRU Rx beam for receiving the data channel.

A beam related indication associated with DL transmission may be included in, for example, DCI, MAC CE, and/or RRC signaling, and may be carried by one or more of NR-PDCCH, NR-ePDCCH, MAC and/or RRC.

A beam related indication may be provided by a TRP for transmitting a UL data channel transmission via a WTRU Tx beam. The UL data channel transmission may be a current or a subsequent UL data channel transmission. The TRP may use a search space to indicate the WTRU Tx beam. The search space may be partitioned into multiple regions or search space segments. A (e.g., each) region or search space segment may be associated with a WTRU Tx beam index. A WTRU may decode a control channel for an uplink grant in a particular control region or search space segment. The WTRU may infer, based on the decoding, that a WTRU Tx beam associated with the control region or search space segment may be used to transmit a current or subsequent UL data channel. For example, a WTRU may decode a control channel in region #j or search space segment #. Based on the decoding, the WTRU may infer that WTRU Tx beam #j may be used for the transmission of a current or subsequent UL data channel.

A TRP may use a previous or current DL control channel (e.g., NR-PDCCH or NR-ePDCCH) to indicate a WTRU Tx beam for receiving a current or subsequent UL data channel transmission. The TRP may embed information (e.g., embed beam indication bits and/or control bits in data, MAC CE, etc.) about the WTRU Tx beam in a NR-PDSCH. The TRP may use a BRS, an MRS and/or a DMRS that may precede the UL data channel to indicate the WTRU Tx beam.

A beam related indication may be provided by a TRP for transmitting a UL control channel. The TRP may use a search space to indicate the WTRU Tx beam. The search space may be partitioned into multiple regions or search space segments. A (e.g., each) region or search space segment may be associated with a WTRU Tx beam index. A WTRU may decode a DL control channel for an uplink grant in a particular control region or a search space segment. Based on the decoding, the WTRU may infer that a corresponding WTRU Tx beam associated with that control region or a search space segment may be used to transmit a current or subsequent UL control channel. For example, a WTRU may decode a DL control channel in region #i or search space segment #i. Based on the decoding, the WTRU may infer that WTRU Tx beam #i may be used for the transmission of a current or subsequent UL control channel.

A TRP may use a previous or current DL control channel (e.g., NR-PDCCH or NR-ePDCCH) to indicate a WTRU Tx beam for transmitting a current or subsequent UL control channel. The TRP may embed information (e.g., embed beam indication bits and/or control bits in data, MAC CE, etc.) about a WTRU Tx beam in a NR-PDSCH. The TRP may use a BRS, an MRS, and/or a DMRS that may precede a UL control channel to indicate a WTRU Tx beam for transmitting the control channel.

A beam related indication with UL transmission may be included in, for example, DCI, MAC CE, and/or RRC signaling, and may be carried by, for example, one or more of NR-PDCCH, NR-ePDCCH, MAC and/or RRC.

A multi-stage indication for a control and/or data channel may be used. In an example of a first stage, a TRP may use one or more of L1/2 control, RRC, MAC CE or search space to indicate a beam set (or subset). In an example of a second stage, a TRP may use DCI or RS to indicate a WTRU Rx beam and/or a WTRU Tx beam within a beam set (or subset) indicated in Stage 1. Control region based hybrid techniques may be used for beam indication. These techniques may utilize RRC to configure a beam set, utilize MAC CE to indicate a subset from the beam set, and/or utilize DCI to indicate one or more beams from the subset.

Beam sweeping may be initiated by a WTRU. Beam sweeping may be based on sub-time units (STUs). A regular time unit (RTU) may refer to an OFDM symbol, an SC-FDMA symbol, and/or the like. An RTU may be associated with a configured reference numerology. A RTU may be used interchangeably with a time unit (TU). A sub-time unit (STU) may refer to a period shorter than a RTU. One or more STUs may be included in a RTU.

STU-based beam sweeping may allow the operation to be performed at a fast speed. A WTRU may initiate beam sweeping before beam switching, e.g., when beam switching may not be immediately available or performed (e.g., due to a lack of knowledge about beam association, beam pairing, and/or a beam pair link set). STU-based beam sweeping may support implementation of beam pairing at a fast speed. A WTRU may initiate (e.g., trigger) TRP Tx beam sweeping and/or WTRU Rx beam sweeping for a DL transmission at an RTU level or an STU level. A WTRU may initiate (e.g., trigger) TRP Rx beam sweeping and/or WTRU Tx beam sweeping for a UL transmission at an RTU level or an STU level.

A same beam may be used as a beam reference signal whether a beam sweeping time or duration is defined as an RTU or an STU. A WTRU may determine that a same beam is used as a beam reference signals within an RTU (e.g., if a beam duration is defined as an RTU), and the WTRU may measure a beam quality in either time or frequency domain. A WTRU may determine that a same beam is used as a beam reference signal within an STU. In that case, the WTRU may measure NB beam qualities over $N_S$ STUs, and one or more STUs (e.g., $N_C$ consecutive STUs) may be configured, determined, or used as a beam duration. A WTRU may determine that a same beam may be used as a beam reference signal within the $N_C$ consecutive STUs.

A WTRU may be configured with $N_S$ STUs as a beam sweeping duration, which may be associated with $N_R$ RTUs. NR may be a positive integer number including 1.

A WTRU may be configured to measure one or more beam reference signals based on STU(s) or RTU(s). The types of time unit (e.g., RTU or STU) may be determined based on beam management procedures (e.g., beam management or beam recovery requirements). For example, a first type of time unit (e.g., STU) may be used for P-1 and/or U-1 while a second type of time unit (e.g., RTU) may be used for P-2 and P-3, or U-2 and U-3. Each procedure, e.g., P-1, P-2, P-3 or U1-, U-2, U-3, may use RTUs or STUs.

The types of time unit (e.g., RTU or STU) may be determined based on whether beam measurement is associated with CSI reporting (e.g., CQI). For example, a first type of time unit (e.g., STU) may be used if the beam measurement is not associated with CSI reporting while a second type of time unit (e.g., RTU) may be used if the beam measurement is associated with CSI reporting. A beam measurement without CSI reporting may be used if the beam measurement is used for Tx and/or Rx beam pairing and/or to determine beam-pair link for control and/or data channels.

The types of time unit (e.g., RTU or STU) may be determined based on the (e.g., maximum) number of Tx beams used in a transmitter. For example, if a transmitter (e.g., a gNB or WTRU) has a (e.g., maximum) number of Tx beams greater than a predefined threshold, a first type of time unit (e.g., STU) may be used. Otherwise, a second type of time unit (e.g., RTU) may be used The types of time unit (e.g., RTU or STU) may be determined based on time locations such as slot numbers, subframe numbers, radio frame numbers, etc. The types of time unit (e.g., RTU or STU) may be determined based on at least one system parameter including subcarrier spacing, frequency band, cell-ID, virtual cell-ID, TRP-ID, system bandwidth, and/or the number of OFDM symbols used for a slot (or mini-slot).

The types of time unit (e.g., RTU or STU) may be determined based on a reference signal type. For example, a first type of time unit (e.g., RTU) may be used for a mobility reference signal (MRS), which may be used for TRP selection, gNB selection, or cell selection while a second type of time unit (e.g., STU) may be used for CSI-RS, which may be used for measurement and/or reporting.

A beam reference signal (BRS), beam measurement reference signal (BMRS), CSI-RS, SRS, DMRS, mobility reference signal, measurement reference signal, and reference signal may be used interchangeably. Beam quality measurement, beam measurement, beam monitoring, best beam detection, and beam selection may be used interchangeably.

A beam reference signal may be constructed based on a DFT spreading before OFDM transmission. For example, a reference signal sequence s with $N_{FFT}$ length may be filtered with $N_{FFT}$-length DFT or FFT, and an output sequence q may be mapped onto $N_{IFFT}$ subcarriers of an OFDM transmission. The resource mapping of $N_{FFT}$-length output sequence q may be mapped onto $N_{IFFT}$-length input u of an OFDM transmission based on the resource mapping matrix M ($N_{FFT} \le NI_{FFT}$) as illustrated by the example in FIG. 13. An output sequence w may be derived with $N_{IFFT}$-length IDFT or IFFT.

At least one of the sequences s, q, u, or w may be considered as a beam reference signal and/or CSI-RS. When $N_{FFT}=N_{IFFT}$, the resource mapping matrix M may be an identity matrix or the resource mapping processing may be bypassed. An $N_{FFT}$ size may be determined based on a corresponding $N_{IFFT}$ size. For example, an $N_{IFFT}$ size may be determined based on the system bandwidth indicated in a broadcasting signal such as a new radio physical broadcast channel (NR-PBCH) or the like, and the $N_{FFT}$ size may be determined as a function of the $N_{IFFT}$ size.

A set of $N_{FFT}$ sizes may be predefined and a subset of $N_{FFT}$ sizes may be determined based on the $N_{IFFT}$ size. At least one of the $N_{FFT}$ sizes within the subset of $N_{FFT}$ sizes may be configured via higher layer signaling or may be indicated (e.g., dynamically indicated).

An $N_{FFT}$ size may be determined based on the number of Tx beams and/or Rx beams used. For example, a transmitter (e.g., gNB, TRP or WTRU) may indicate, configure, or identify the number of Tx beams, and the NFFT size may be determined based on the indicated, configured, or identified number of Tx beams. An $N_{FFT}$ size may be determined based on a $N_{IFFT}$ size and/or the number of Tx beams used. A set of $N_{FFT}$ sizes may be predefined and a subset of $N_{FFT}$ sizes may be determined based on the $N_{IFFT}$ size. An $N_{FFT}$ size within the subset of $N_{FFT}$ sizes may be determined based on the number of Tx beams used. The number of Tx beams and/or Rx beams may include at least one of following: the number of Tx beams and/or Rx beams used for a control channel (e.g., NR-PDCCH or the like), the number of Tx beams and/or Rx beams associated with a current serving cell or TRP, a synchronization signal, common search space, a control resource set, etc.

An $N_{FFT}$ size may be determined based on the direction of a concerned transmission. For example, an $N_{FFT}$ size may be determined based on whether the concerned transmission is an uplink or downlink transmission. A first $N_{FFT}$ size may be used in the downlink, while a second $N_{FFT}$ size may be used in the uplink. The $N_{FFT}$ size for a downlink transmission may be determined based on at least one of $N_{IFFT}$ size or the number of Tx beams and/or Rx beams used. The $N_{FFT}$ size for an uplink transmission may be indicated by a gNB or TRP. A periodic or semi-persistent beam reference signal may be configured (e.g., triggered) by downlink control information (e.g., DCI or MAC-CE), and an $N_{FFT}$ size may be indicated in the downlink control information. A periodic beam reference signal may include a one-shot transmission or multi-shot transmissions. A semi-persistent beam reference signal may include a periodic transmission with activation/deactivation. A beam reference signal in the uplink may be referred to as a sounding reference signal (SRS). A beam reference signal in the downlink may be referred to as a CSI-RS.

An $N_{FFT}$ size may be determined as a function of a maximum transmission power. For example, a first $N_{FFT}$ size may be used when the maximum transmission power is above a predefined threshold, and a second $N_{FFT}$ size may be used when the maximum transmission power is below a predefined threshold.

Figure 13:
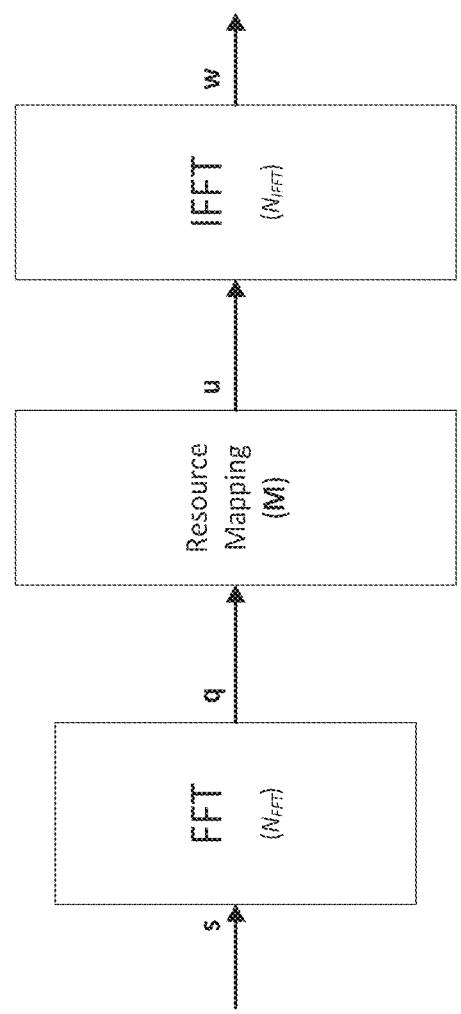
FIG. 13 is a diagram illustrating an example of beam reference signal (BRS) generation using discrete Fourier transform spread orthogonal frequency division multiplexing (DFT-s-OFDM) or DFT-spread.

FIG. 13 is a diagram illustrating an example of BRS generation using DFT-s-OFDM or DFT-spread. An example DFT-s-OFDM transmitter is shown. An input signal s may be spread by an FFT function, mapped to a specific location in the frequency domain by a resource mapping matrix M (e.g., a subcarrier mapping matrix), and transformed back to a time domain signal by an IFFT function. A CP insertion block may be used with (e.g., accompany or as part of) the example DFT-s-OFDM transmitter. The matrix M may have a dimension of $N_{IFFT} \times N_{FFT}$ in accordance with Eq. 1:

$$M = \begin{bmatrix} 0 \\ I_{N_{FFT}} \\ 0 \end{bmatrix}_{N_{IFFT} \times N_{FFT}} \qquad \text{Eq. 1}$$

where the identity matrix $I_{N_{FFT}}$ may be mapped along a vertical column.

An output signal w of the DFT-s-OFDM transmitter may be considered an interpolated version of the input signal s (e.g., which may be a vector) with an interpolation ratio of $N_{IFFT}/N_{FFT}$. The signal may exhibit characteristics (e.g., flexibility) that may facilitate the creation of time units (TUs) with variable lengths within a DFT-s-OFDM symbol. These characteristics (e.g., flexibility) may be leveraged to support the implementation of a fast beam sweeping mechanism.

Figure 14:
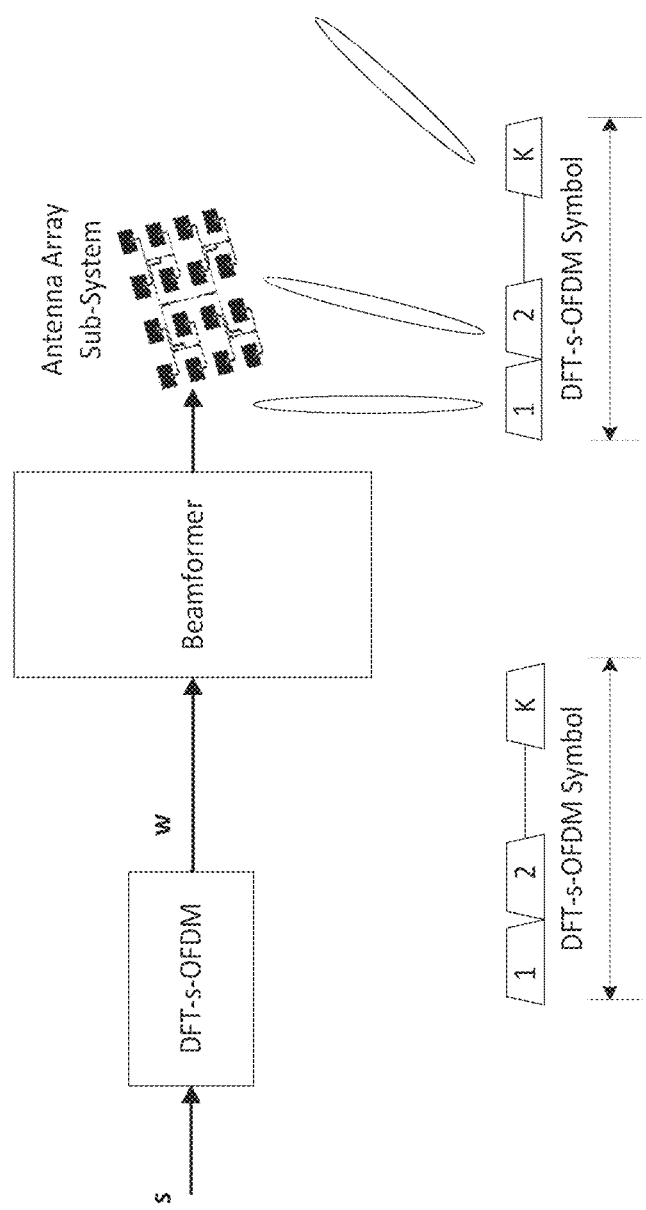
FIG. 14 is a diagram illustrating an example of beam-sweeping over K segments (or K sub-time units (STUs)) of a DFT-s-OFDM symbol.

FIG. 14 is a diagram illustrating an example of beam sweeping over K segments (e.g., K STUs) of a DFT-s-OFDM symbol or an OFDM symbol. A vector w generated based on an input signal s (e.g., via an example DFT-s-OFDM transmitter as described herein) may be beamformed to multiple spatial directions within a duration of a DFT-s-OFDM symbol. The DFT-s-OFDM transmitter may be coupled with a beamformer. K segments of a DFT-s-OFDM symbol may be beamformed with K different beams. A (e.g., each) segment may be considered a sub-TU. A segment, sub-TU, and STU may be used interchangeably.

K segments in a DFT-s-OFDM symbol (e.g., an OFDM symbol) may be non-overlapping in a time domain. The time length for each segment within a DFT-s-OFDM symbol (or OFDM symbol) may have a same or a different time length.

The number of beams may be equal to or smaller than the number of segments. The number of segments associated with a beam may be determined, configured, or used based on at least one of following. $N_C$ segments (or STUs) may be associated with a beam, wherein the $N_C$ segments may be consecutive or distributed within a DFT-s-OFDM symbol (or OFDM symbol). The value of $N_C$ may be determined based on the number of Tx beams and/or Rx beams used. The value of $N_C$ may be determined based on at least one of the following: the number of Tx beams and/or Rx beams, the number of segments or STUs, and/or the number DFT-s-OFDM symbols (or OFDM symbols) used for beam reference signal transmission.

One or more segments associated with a beam may include at least one of a beam reference signal, control information associated with the beam, or data information associated with the beam. A beam reference signal may be based on a predefined sequence. A set of sequences may be used, configured, and/or predefined. One of the set of sequences may be selected or determined based on a beam identity or beam index. A WTRU may (e.g., without an indication from a TRP) detect the sequence used for the beam reference signal and identify the beam index. A WTRU may report a preferred beam index based on the measurement of a beam reference signal and/or a detected beam index. The preferred beam index may be the beam index that may provide a highest received signal strength. A received signal strength may be indicated by or derived from a reference signal received power (RSRP) such as a L1-RSRP.

Control information associated with a beam may be transmitted in one or more segments associated with the beam. For example, HARQ-ACK information may be transmitted in one or more segments associated with a beam. The sequences in one or more segments in a DFT-s-OFDM (or OFDM) symbol may include beam-related information.

A beam reference signal (BRS) may be transmitted in a segment or multiple segments. The BRS sequence length may be determined based on the number of segments used for the BRS transmission. For example, a first BRS sequence length may be used if the BRS is transmitted over K1 segments, and a second BRS sequence length may be used if the BRS is transmitted over K2 segments. The first BRS sequence length may be shorter that the second BRS sequence length if K1<K2. A longer BRS sequence length may be used with a wider beamwidth.

A signal s may be designed and/or may be configured to create a DFT-s-OFDM (or OFDM) symbol with K segments in time. A beamformer may apply K different sets of beamforming parameters to re-adjust the beam for a (e.g., each) segment or sub-TU. Generated beam patterns may be the same or different from one symbol to another. Segmented DFT-s-OFDM symbols or OFDM symbols may be mapped to a same frequency location associated with a same matrix M or to different frequency locations from one symbol to another.

The frequency location of the output sequence q in FIG. 13 may be determined based on the matrix M shown therein. The matrix M may in turn be determined as follows. The matrix M may be selected from one or more matrices that may be predefined, configured, or used. The matrix M may be associated with (e.g., be referred to as) frequency location mapping or determination of BRS transmission. The matrix M may be determined based on one or more system parameters including cell-ID, slot number, subframe number, mini-slot number, virtual cell-ID, and/or TRP-ID. The matrix M may be determined in a way to reduce inter-cell interference. The matrix M may be determined based on one or more WTRU-specific parameters including WTRU-ID, scheduled subframe number, slot number, and/or min-slot number. The matrix M may be configured, indicated, or signalled via a higher layer signalling. The higher layer signalling may include a broadcasting signal such as NR-PBCH, a secondary NR-PBCH, system information, and/or WTRU-specific RRC signalling. The matrix M may be determined based on one or more beam related parameters such as the number of Tx beams. The matrix M may be used to indicate a set of beams. For example, one or more sets of beams may be used and M may indicate which set of beams are used for BRS transmission. A WTRU may detect (e.g., blindly detect) M to determine which set of beams are used.

The input signal s in FIG. 13 may be segmented into one or more parts, e.g., $s=[s_1 s_2 \ldots s_K]_{1 \times N_{FFT}}$, where $s_i$'s may have different lengths. $s_i$ may start and end with a number of zero elements, e.g., $s_i=[0 \cdots 0 \, \sigma_1 \cdots \sigma_{L_i} 0 \cdots 0]$, where $\sigma_i=[\sigma_1 \cdots \sigma_{L_i}]$ may be a non-zero vector. Padding $s_i$ with zeros may facilitate transition from one beam to another. One or more of the following may apply. The number of zero elements in segment input $s_i$ may be determined based on the number of bits transmitted in $s_i$. The number of zero elements in segment input $s_i$ may be configured and/or indicated by a transmitter. $s_i$ may include all non-zero elements. $s_i$ may include all zero elements. For example, even-numbered segment input $s_i$ may be include all non-zero elements while odd-numbered segment input $s_i$ may include all zero elements. Zero-filled input segments may be used as gaps between non-zero input segments.

A reference signal and data may be multiplexed within a non-zero vector $\sigma_i$ in a segment input $s_i$. For example, a first set of one or more non-zero elements (e.g., $\sigma_1$, $\sigma_2$) may be used for a reference signal, and a second set of one or more non-zero elements (e.g., the remaining non-zero elements $\sigma_3, \ldots, \sigma_{L_i}$) may be used for data transmission. The data transmission may include control information, unicast traffic information, HARQ-ACK signalling (e.g., PHICH, NR-PHICH, etc.), and/or the like. The location of non-zero elements within a segment input $s_i$ that may be used for a reference signal and/or data may be determined based on the number of non-zero elements in the segment input signal.

Figure 15:
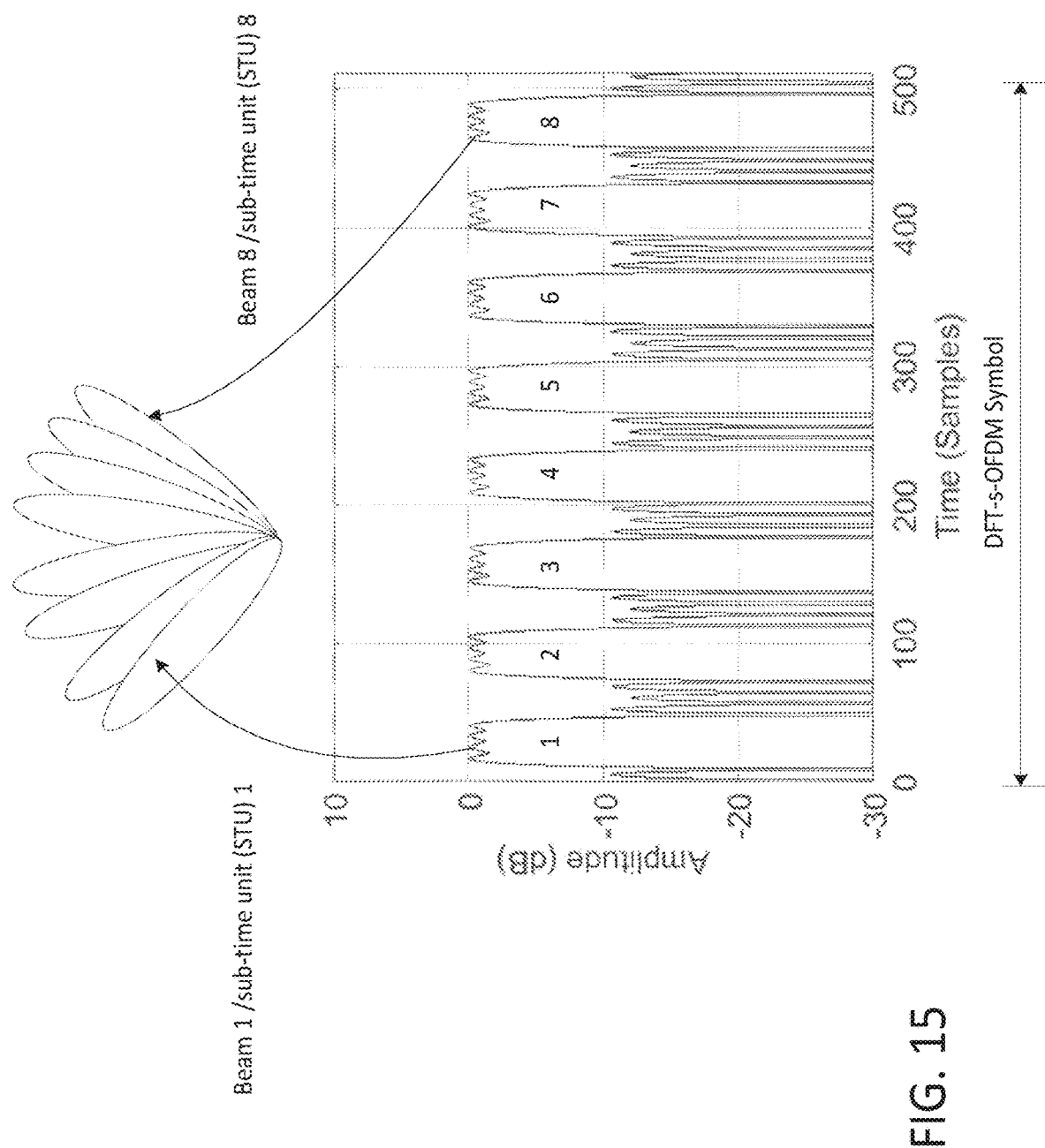
FIG. 15 is a diagram illustrating an example of beam sweeping over 8 STUs of a DFT-s-OFDM or OFDM symbol.

FIG. 15 is a diagram illustrating an example of beam sweeping over 8 STUs of a DFT-s-OFDM or OFDM symbol. One or more of the STUs (e.g., each of the STUs) may be beamformed with a unique pattern. An input segment $s_i$ may be padded with one or more zeros, e.g., to create a level of isolation (e.g., a gap) between the STUs. The isolation may give a WTRU or a TRP more time to perform beam reconfiguration.

An input vector s or its sub-parts $s_i$ may be selected from a predefined codebook and/or may be determined based on one or more configuration parameters including Cell-ID, number of beams, channel/service type identity, subframe number, system frame number, slot number, mini-slot number, number of TX antennas, etc. The input vector s may be filtered by a FFT function to produce an output vector sequence q, e.g., as shown in FIG. 13.

Figure 16A:
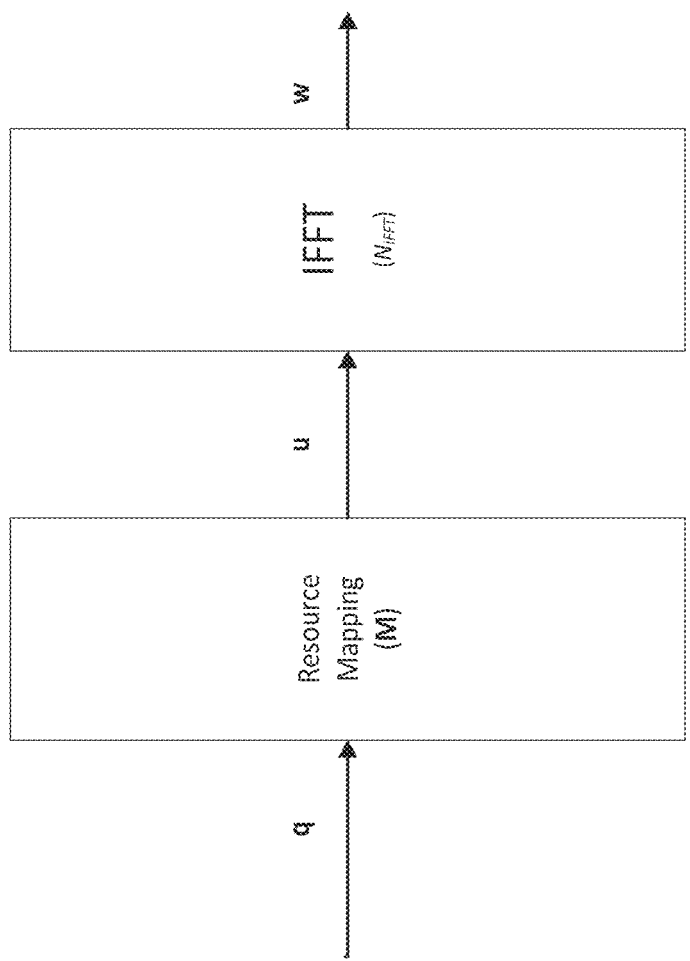
FIG. 16A is a block diagram illustrating an example of a STU beam generator configured to use OFDM.

FIG. 16A is a block-diagram illustrating an example of a STU beam generator configured to use OFDM. The vector q, as described herein, may be selected from a set of pre-computed codebooks. The pre-computed codebooks may be stored in a transmitter. The transmitter may be an OFDM transmitter. A same set of segment input vectors s, may be applied to one or more (e.g., all) STUs, e.g., to facilitate system functions such as channel sounding, synchronization, and/or transmission (e.g., carrying of) of system information such as cell-ID, number of TX antennas, system frame number, subframe number, slot number, mini-slot number, channel/service type, etc. A segment input vector $s_i$ may carry STU specific (e.g., unique to a STU) identification information. Such information may be used to indicate the identity of a transmitted beam to a receiver, e.g., to facilitate beam pairing. A segment input vector $s_i$ may carry a combination of STU specific (e.g., unique to a STU) identification information and information that may be common across multiple STUs.

The content of a vector $\sigma_i$ (e.g., a non-zero vector) within a segment input $s_i$ may be the same for multiple (e.g., all) STUs, e.g., to assist system functions such as channel sounding, synchronization, or transmission of (e.g., carrying of) system information (e.g., cell-ID, number of TX antennas, system frame number, subframe number, slot number, mini-slot number, channel/service type, etc.). The content of a vector $\sigma_i$ may include unique identification information, e.g., to indicate an identity of a transmitted beam to a receiver. The identification information may be used to facilitate beam pairing, for example. The content of a vector $\sigma_i$ may include a combination of STU specification information (e.g., unique identification information) and information that may be common across multiple STUs.

Figure 16B:
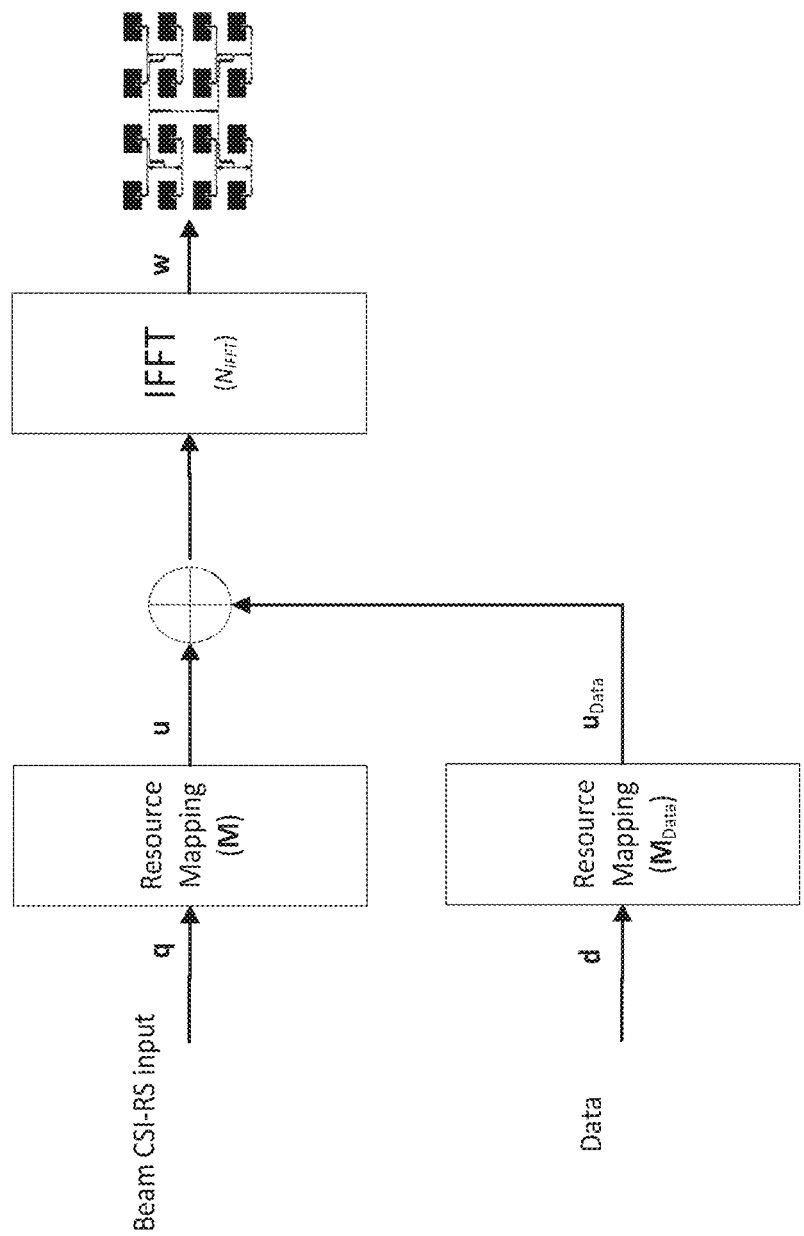
FIG. 16B is a block diagram illustrating an example of simultaneous transmission of data and beam forming channel state information reference signal (CSI-RS) using the same beam.

Beam sweeping may be performed simultaneously with data transmission. FIG. 16B is a diagram illustrating an example structure for transmitting a beam CSI-RS input q simultaneously with a data vector d. The matrix $M_{Data}$ may represent a subcarrier mapping function that maps the data vector d at a specific part of the transmission band. The part of the transmission band may be one not used by a beam sweeping operation. The matrix $M_{Data}$ may have a dimension of $N_{IFFT} \times N_{FFT}$. Matrices M and $M_{Data}$ may partially overlap or may be completely orthogonal.

Figure 16C:
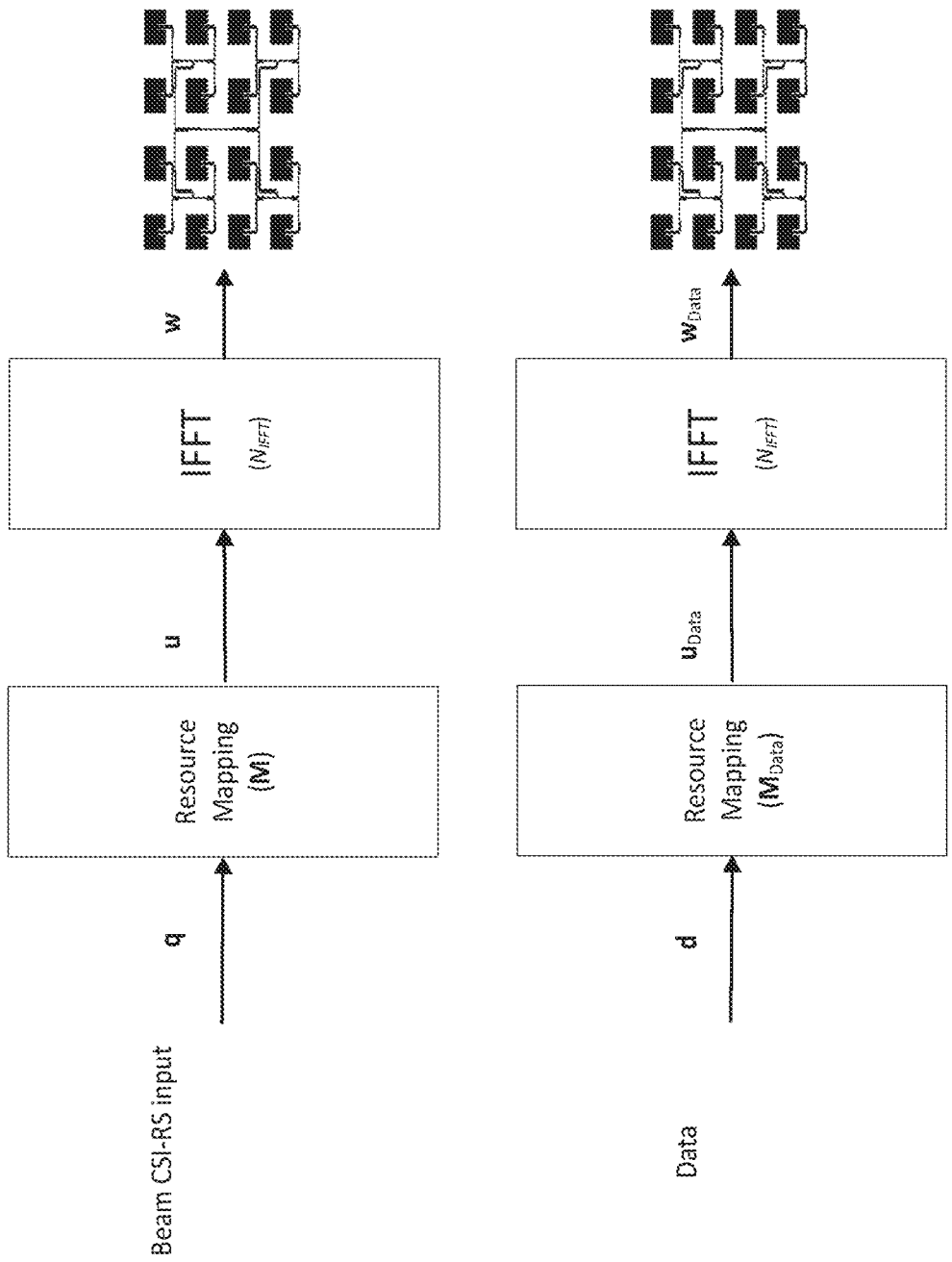
FIG. 16C is a block diagram illustrating an example of simultaneously transmitting beam CSI-RS and data using different beams.

Data transmission and beam sweeping may employ a same beam. FIG. 16B illustrates an example of simultaneous transmission of beam CSI-RS and data using a same beam. The beam CSI-RS may be DTF-based STU CSI-RS and may be used for WTRU-initiated beam sweeping. Data transmission that is simultaneous to a beam CSI-RS transmission may utilize a different beam than that used for the beam CSI-RS and/or beam sweeping (e.g., assuming a concerned WTRU or TRP is configured with independent beamforming capabilities). FIG. 16C is a diagram illustrating an example of simultaneously transmitting beam CSI-RS and data using different beams.

WTRU-initiated beam sweeping may be performed with DFT-based STU CSI-RS. A WTRU may initiate beam sweeping by sending a beam sweeping request to a TRP or a gNB. The beam sweeping request may be sent on a scheduling request such as a NR-PUCCH, a PRACH preamble, and/or a PRACH-like request. A gNB may configure beam sweeping to be RTU-based and/or STU-based, as described herein.

Figure 17:
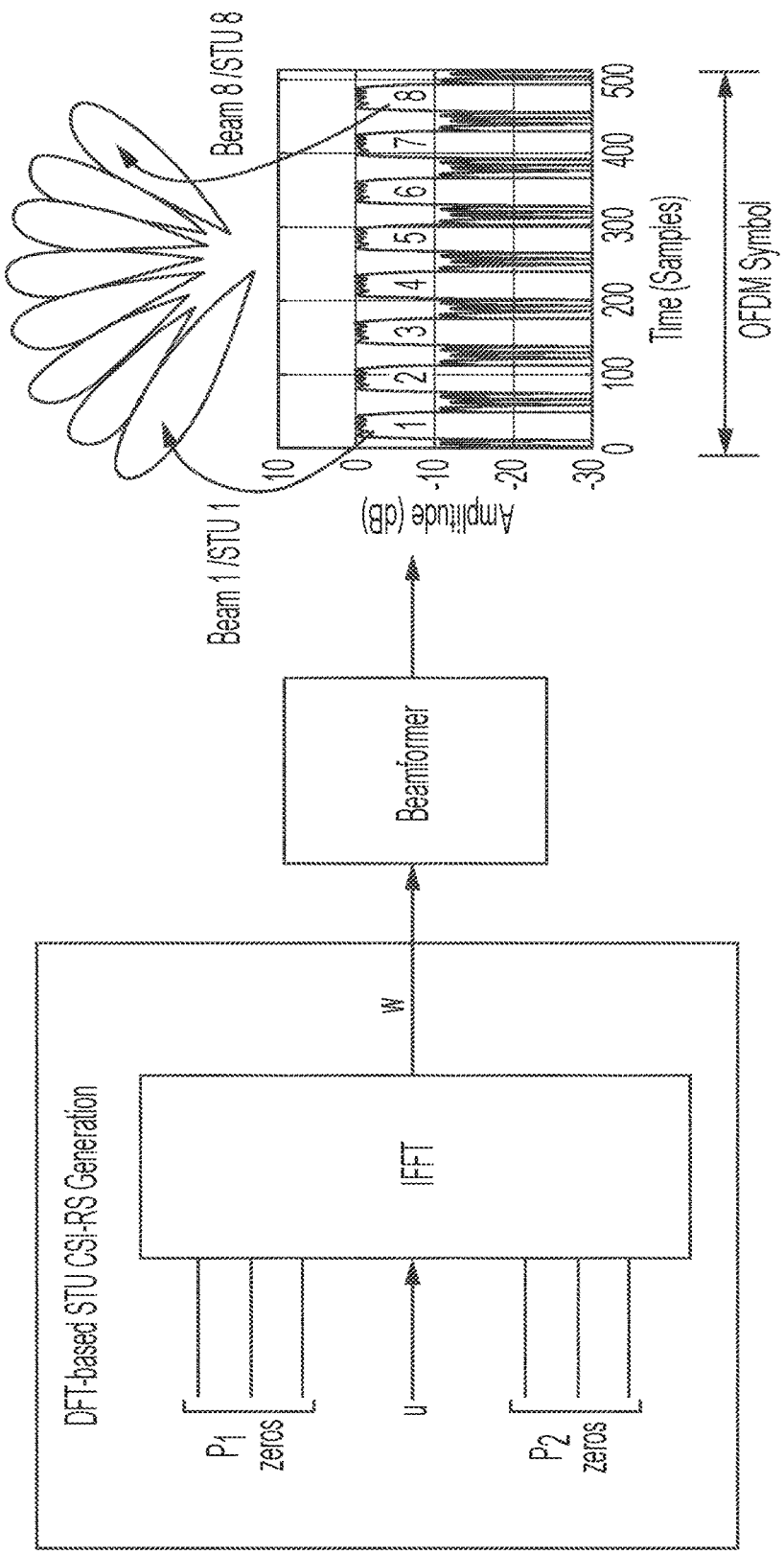
FIG. 17 is a diagram illustrating an example of a DTF-based STU CSI-RS with 8 STUs.

STU CSI-RS may be generated using one or more of larger subcarrier spacing, IFDMA or a DFT-based STU scheme (e.g., if STU-based fast beam sweeping is configured). DFT-based STU CSI-RS may be generated as described herein. FIG. 17 is a diagram illustrating an example of a DTF-based STU CSI-RS with 8 STUs. A reference signal u with a length of $N_{FFT}$ may be mapped to a location in the frequency domain, and may be converted to a time domain signal by an IFFT function. u may be a DFT transformation of an input vector s. s may be segmented into K parts, e.g., $s=[s_1 s_2 \cdots s_K]_{1 \times N_{FFT}}$. In the example shown in FIG. 17, K may have a value of 8. The transition from one beam to another may be facilitated by zero-padding one or more of the input segments $s_i$. Each input segment $s_i$ may carry different information, e.g., beam ID, cell ID, etc. The output of the IFFT function w can be sliced into K independent STUs per OFDM symbol, e.g., to allow independent beamforming and/or to support implementation of fast beam sweeping. For example, eight STU CSI-RS may be generated and transmitted within one OFDM symbol.

A WTRU may receive configuration information such as a beam sweeping type (e.g., RTU or STU) and/or an associated number of STUs per Tx symbol (e.g., per OFDM symbol). The configuration may be received by the WTRU if DFT-based STU CSI-RS is configured, for example. A WTRU may perform beam measurement based on a CSI-RS configuration. A WTRU may execute beam pairing, e.g., upon performing beam measurement. The example systems, methods, and/or implementations described herein may be applied to OFDM, DFT-s-OFDM, UW-OFDM, and/or UW-DFT-s-OFDM waveforms.

The performance of DFT-based STU CSI-RS may be evaluated, for example, based on simulation results of a DFT-based IFDMA STU generation mechanism. OFDM symbol-based measurement is provided herein as an example. Simultaneous transmission of data and CSI-RS may be demonstrated.

Figure 18A:
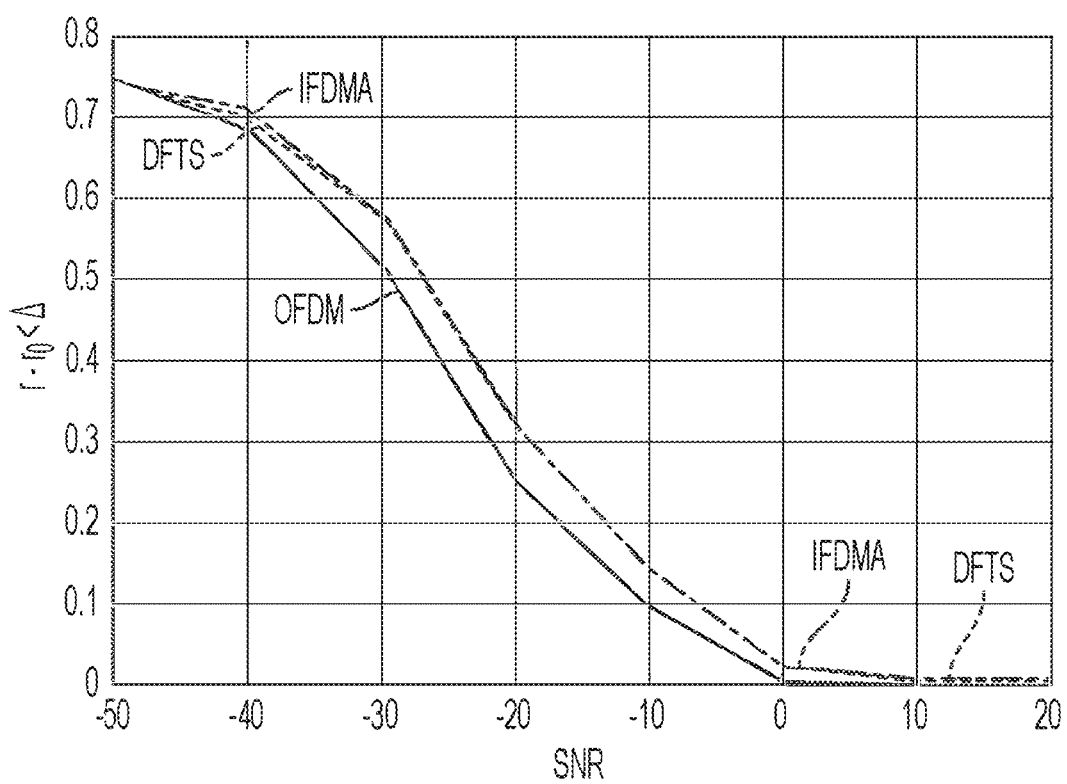
FIG. 18A is a diagram showing performance evaluation results of example STU generation mechanisms.

FIG. 18A is a diagram showing performance evaluation results of example STU generation mechanisms. The respective performances of IFDMA STU CSI-RS, DFT-based STU CSI-RS, and symbol-based OFDM STU CSI-RS are shown. The performance of IFDMA STU CSI-RS may be similar to that of DFT-based STU CSI-RS. The performance of symbol-based OFDM STU CSI-RS may be improved by having a long span (e.g., four times longer than normal) for beam selection and pairing. For DFT-based and IFDMA STU CSI-RS, a (e.g., each) symbol may be divided into 4 STUs. A TX beam may be pointed in the direction of a strong (e.g., the strongest) cluster. For the receiver, 4 RX beams may be considered during beam search. For each drop, one of the RX beams may be pointed to the strongest cluster, while the others may be selected (e.g., randomly selected) from a set of angles that may span equally around the strongest cluster. A metric ($r-r_0$) may be used as a performance metric, where r and $r_0$ may be the corresponding RSRP measurements for a selected beam and an ideal beam. The inaccuracy of a selection may be evaluated based on the percentage time during which $r-r_0$ is less than $\Delta$, where $\Delta$ may be set at $-1$ dB.

Figure 18B:
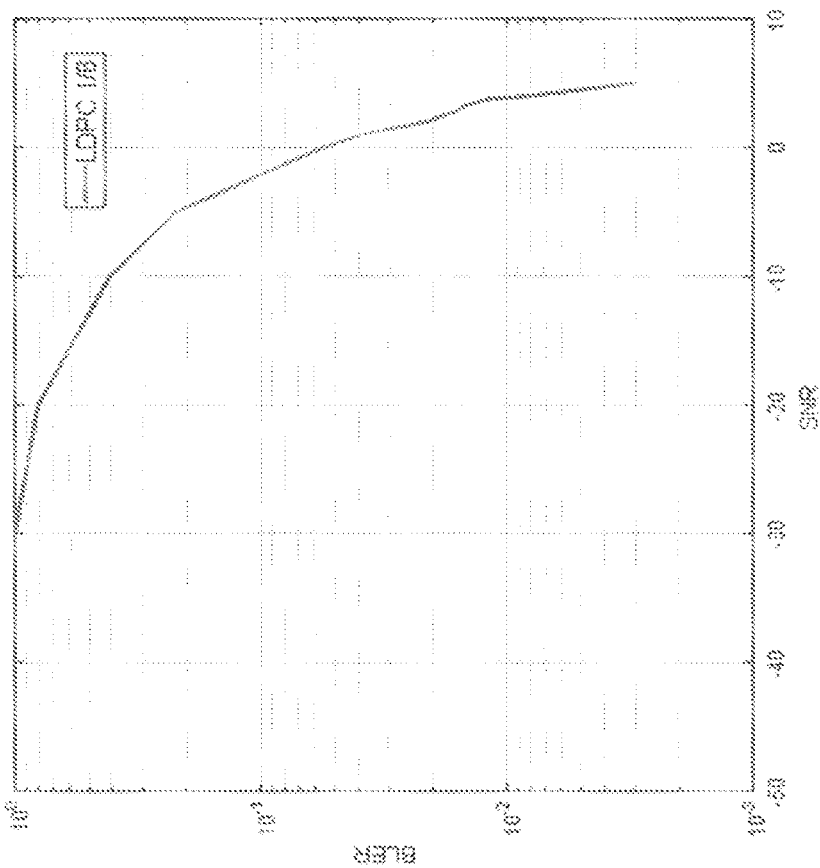
FIG. 18B is a diagram showing performance evaluation results of an example data link while a CSI-RS transmission for beam recovery/refinement is conducted to yield the results shown in FIG. 18A.

FIG. 18B is a diagram showing the performance of an example data link while a CSI-RS transmission for beam recovery/refinement is conducted to yield the results shown in FIG. 18A. In the example, a LDPC coded packet with a payload size of 170 bits is sent with QPSK modulation over the data link. The CSI-RS and QPSK symbols are mapped on separate clusters of 512 subcarriers.

Figure 19:
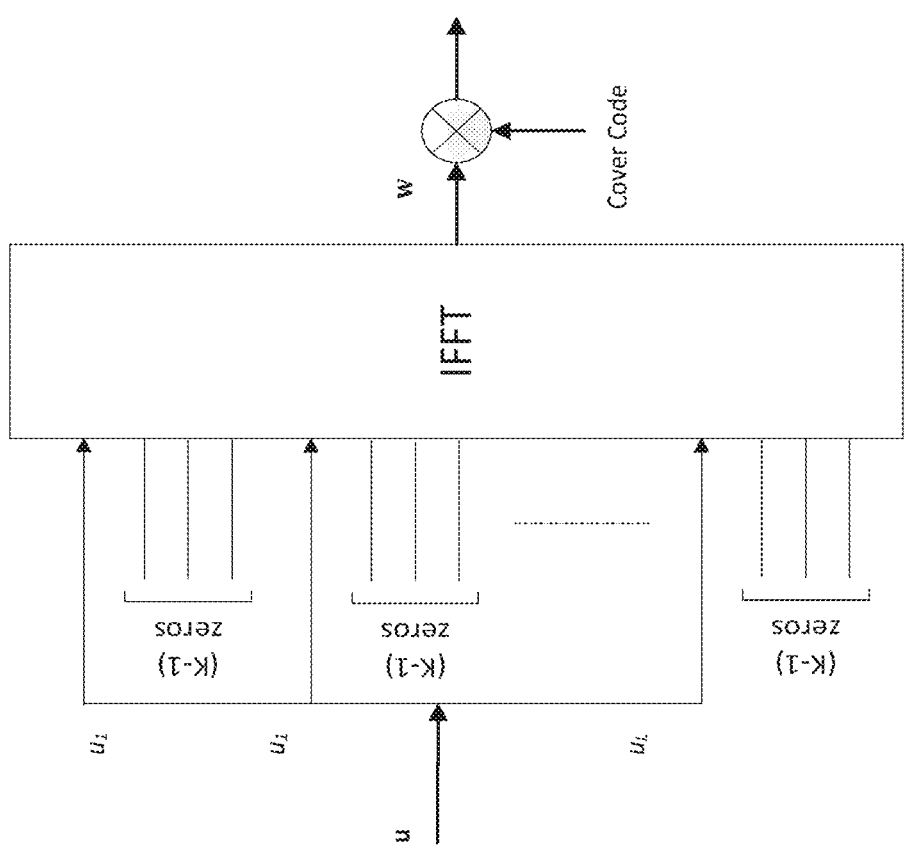
FIG. 19 is a block diagram illustrating an example of a STU beam generator using IFDMA.

FIG. 19 is a block diagram illustrating an example of a STU beam generator using IFDMA. STU-based beam sweeping may be implemented with IFDMA. An input vector u with a length L may be over sampled by K to create K segments (e.g., K similar segments) in the time domain for beam sweeping. The vector u may carry a sequence to assist other system functions such as channel sounding, synchronization, and/or transmission of system information (e.g., cell-ID, number of TX antennas, system frame number, subframe number, TRP identity, beam group identity, slot number, mini-slot number, channel/service type, etc.). An example sequence that may be carried in the vector u may be a Zadoff-Chu (ZC) sequence or a similar sequence with good correlation properties.

An output vector w may be produced. If the content of w is similar for one or more beams, the vector w may be tagged with an orthogonal cover code. The tagging may distinguish a beam from the other (K−1) beams. Examples of orthogonal cover codes may include Hadamard or DFT-based vectors.

Beam-centric radio link failure (RLF) may be detected. RLF may be caused by beam quality degradation, which in turn may be caused by WTRU mobility/rotation, blockage, link failures, and/or the like. The degradation may occur randomly. RLF and RRC connection re-establishment may result in latency and may impact throughput. Quick beam recovery mechanisms (e.g., beam switching) may be used to avoid the burden and interruption associated with having to perform an acquisition procedure. RLF may be detected and remedied by beam switching. A WTRU may trigger and initiate beam recovery (e.g., beam switching and/or sweeping) when the WTRU cannot decode a DL signal via a current beam. Beam switching and/or sweeping may be triggered or initiated before RLF is declared.

An RLF parameter (e.g., such as N310) may be used to trigger beam switching. The parameter may be related to a block error rate (BLER) threshold. Such a BLER threshold (e.g., 10% for out-of-sync declaration) may be associated with radio link monitoring and may be reused for beam failure recovery. The parameter may be set to indicate an allowed number of intervals (e.g., 200 ms intervals) during which a WTRU is unable to successfully decode a PDCCH or NR-PDCCH, e.g., due to a low RSRP detection. A WTRU may start an RLF timer when the WTRU cannot decode a DL signal for a certain number of out-of-sync indications (e.g., consecutive out-of-sync indications). The RLF timer (e.g., T310) may be configured by a network. The number of out-of-sync indications may be specified by the aforementioned RLF parameter (e.g., N310). A WTRU may initiate beam switching when the RLF is detected (e.g., at the start of a RLF). A WTRU can avoid an RLF when the WTRU can successfully switch the beam and decode DL signal again. This mechanism be suited, for example, for a non-standalone NR system for backward compatibility (e.g., with LTE).

One or more other parameters may be dedicated for triggering beam switching. For example, a parameter NR-N1 may be set to indicate a certain number of consecutive beam switching measurements (BSMs) during which a WTRU is expected to decode a DL signal. NR-N1 may indicate a pre-defined or configured threshold associated with beam quality degradation. NR-N1 may indicate a number of times in which a WTRU may not successfully decode a downlink signal due to beam quality degradation. BSM may be a beam quality related measurement or indication, such as, for example, SINR, RSSI, RSRP, RSRQ, and/or CQI associated with a serving beam. If NR-N1 is set and the WTRU cannot decode a DL signal for the number of consecutive BSMs specified by NR-N1, the WTRU may declare a beam recovery and initiate beam switching.

Figure 20:
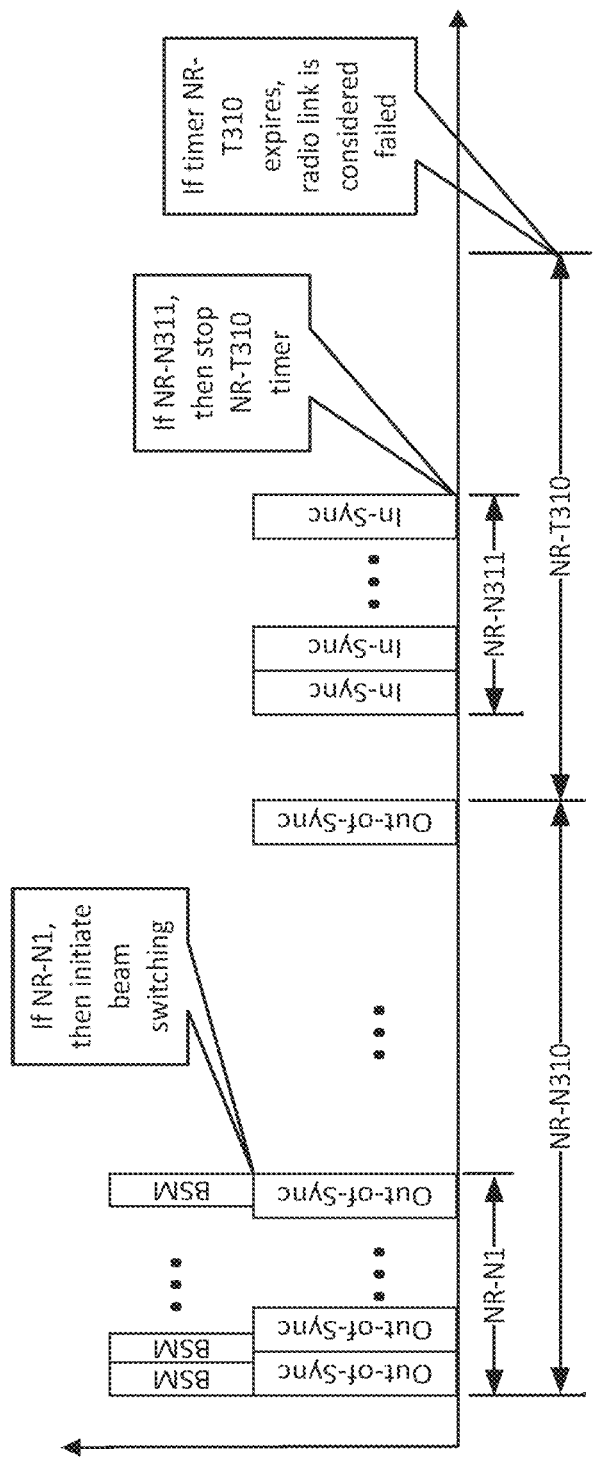
FIG. 20 is a diagram illustrating an example of an RFL detection timeline with beam switching.

FIG. 20 is a diagram illustrating an example of an RFL detection timeline with beam switching. NR-T310, NR-N310, NR-N311 may be parameters and/or timers related to RLF detection with beam switching. These parameters and/or timers may be pre-specified or configured. An 'Out-of-Sync' indication may mean a time duration of X in which consecutive NR-PDCCH decoding failure occurs. An "in-Sync" indication may mean a time duration of Y in which consecutive NR-PDCCH decoding success occurs. A "BSM" Indication may mean a time duration of Z in which beam switching measurement is taken. X, Y and Z may have the same or different values. In an example, X may be 20 subframes, Y may be 10 subframes and Z may be 1 subframe. A BSM indication may indicate the beam quality of beam pair link(s) associated with one or more of an associated control channel, such as NR-PDCCH, and/or an associated data channel, such as NR-PDSCH. For multiple beam pair links configured, if a pre-defined or pre-configured number of beam pair links falls below a certain threshold fulfilling a beam failure condition, a beam failure may be declared and beam recovery, such as beam switching may be requested before RLF is declared.

Figure 21:
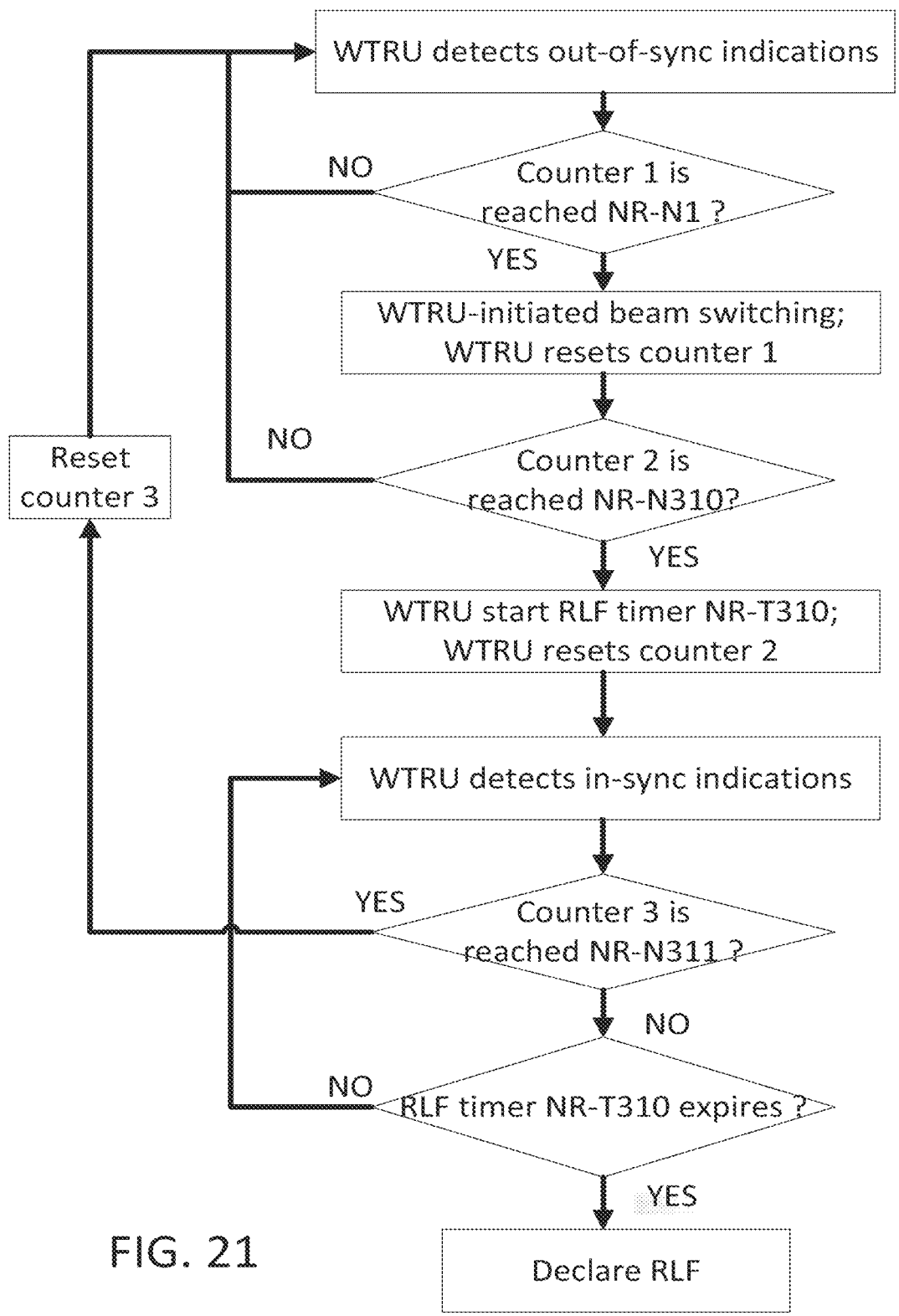
FIG. 21 is a diagram illustrating an example of a trigger mechanism for RLF detection with beam switching.

FIG. 21 is a diagram illustrating an example of a trigger mechanism for RLF detection with beam switching. A WTRU may declare a beam failure and initiate a beam recovery, such as beam switching, for example, when NR-N1 is set and when the WTRU may not decode a DL signal for the certain number of consecutive BSM indications specified in NR-N1. The WTRU may start a timer NR-T310 (e.g., which may be network-configured) when a WTRU may not decode a DL signal for a certain number of consecutive out-of-sync indications specified by a parameter NR-N310. The timer may be stopped when a number of consecutive in-sync indications (e.g., specified by a parameter NR-N311) may be reported by the WTRU's physical layer. RLF may be declared and RLF may occur when the timer NR-T310 expires. The WTRU may perform an RRC connection re-establishment, for example, via RACH.

Parameter NR-N1 may be set to be smaller than NR-N310 in value, for example, in case a BSM may use Out-of-Sync instead of BSM, e.g., to achieve a fast beam switch. A WTRU may initiate beam switching before NR-N310 and before an RLF timer starts. This may enable the WTRU to have enough time to perform a beam switch before RLF may be declared.

Features, elements and actions (e.g. processes and instrumentalities) are described by way of non-limiting examples. While examples are directed to LTE, LTE-A, New Radio (NR) or 5G protocols, subject matter herein is applicable to other wireless communications, systems, services and protocols. Each feature, element, action or other aspect of the described subject matter, whether presented in figures or description, may be implemented alone or in any combination, including with other subject matter, whether known or unknown, in any order, regardless of examples presented herein.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A method Implemented in a wireless transmit receive unit (WTRU), the method comprising:
    determining, based on a channel state Information-reference signal (CSI-RS) or a synchronization signal block (SSB), that a beam failure condition has occurred, wherein the beam failure condition is associated with transmissions between the WTRU and a network entity;
    transmitting a beam failure recovery request to the network entity using a Physical Random Access Channel (PRACH) resource, wherein the beam failure recovery request indicates a candidate beam Identified by the WTRU,
        wherein the beam failure recovery request is sent if the candidate beam has been identified by measuring beam quality on at least one of the CSI-RS or the SSB being above a threshold for resolving the beam failure condition, the PRACH resource used to transmit the beam failure recovery request being associated with at least one of a reference signal or a synchronization signal block; and
    receiving a response associated with the beam failure recovery request from the network entity by monitoring a physical downlink control channel (PDCCH) and reporting or indicating to a higher layer if the WTRU does not receive a response within a time window.

2. The method of claim 1, wherein the response is received from the network entity after a pre-defined number of time slots upon sending the beam failure recovery request.

3. The method of claim 2, wherein the response includes an indication about a beam switching request, indicating confirm, reject, or override the beam switching request/recommendation from the WTRU.

4. The method of claim 1, wherein determining that the beam failure condition has occurred comprises determining that all serving beams associated with transmissions between the WTRU and the network entity have failed.

5. The method of claim 1, wherein the CSI-RS or the SSB is associated with a physical downlink control channel (PDCCH) demodulation reference signal (DM-RS) through spatial quasi-collocation (QCL).

6. The method of claim 1, wherein the PRACH resource or the PUCCH resource used to transmit the beam failure recovery request is selected based on an uplink synchronization status.

7. The method of claim 1, wherein the response includes an indication about a beam switching request, indicating confirm, reject, or override the beam switching request/recommendation from the WTRU.

8. A wireless transmit receive unit (WTRU) comprising:
    a processor configured to:
    determine, based on a channel state Information-reference signal (CSI-RS) or a synchronization signal block (SSB), that a beam failure condition has occurred, wherein the beam failure condition is associated with transmissions between the WTRU and a network entity;
    transmit a beam failure recovery request to the network entity using a Physical Random Access Channel (PRACH) resource, wherein the beam failure recovery request indicates a candidate beam identified by the WTRU,
        wherein the beam failure recovery request is sent if the candidate beam has been identified by measuring beam quality on at least one of the CSI-RS or the SSB being above a threshold for resolving the beam failure condition, the PRACH resource used to transmit the beam failure recovery request being associated with at least one of a reference signal or a synchronization signal block; and
    receive a response associated with the beam failure recovery request from the network entity by monitoring a physical downlink control channel (PDCCH) and reporting or indicating to a higher layer if the WTRU does not receive a response within a time window.

9. The WTRU of claim 8, wherein the CSI-RS or the SSB is associated with a physical downlink control channel (PDCCH) demodulation reference signal (DM-RS) through spatial quasi-collocation (QCL).

10. The WTRU of claim 8, wherein the processor being configured to determine that the beam failure condition has occurred comprises the processor being configured to determine that a physical downlink control channel (PDCCH) associated with al serving beams of the WTRU has been configured.

11. The WTRU of claim 10, wherein the processor is further configured to monitor the PDCCH for the response from the network entity.

12. The WTRU of claim 8, wherein the processor is configured to select the PRACH resource or PUCCH resource based on an uplink synchronization status.

13. The WTRU of claim 8, wherein the processor is further configured to determine a beam for receiving a downlink transmission in response to receiving, from the network entity, a beam indication associated with a control region and an explicit signal included in downlink control information (DCI) or in a medium access control (MAC) control element (CE).

14. The WTRU of claim 8, wherein the processor being configured to determine that the beam failure condition has occurred comprises the processor being configured to determine that all serving beams associated with transmissions between the WTRU and the network entity have failed.

15. A base station comprising:
a processor configured to:
transmit a channel state information-reference signal (CSI-RS) or a synchronization signal block (SSB) for determining, by a wireless transmit receive unit (WTRU), that a beam failure condition has occurred, wherein the beam failure condition is associated with transmissions between the WTRU and the base station;
receive a beam failure recovery request from the WTRU using a Physical Random Access Channel (PRACH) resource, wherein the beam failure recovery request indicates a candidate beam Identified by the WTRU,
wherein the beam failure recovery request is received if the candidate beam has been identified by measuring beam quality on at least one of the CSI-RS or the SSB being above a threshold for resolving the beam failure condition, the PRACH resource used to receive the beam failure recovery request being associated with at least one of a reference signal or a synchronization signal block; and
transmit a response associated with the beam failure recovery request to the WTRU within a time window.

16. A method implemented in a base station, the method comprising:
transmitting a channel state information-reference signal (CSI-RS) or a synchronization signal block (SSB) for determining, by a wireless transmit receive unit (WTRU), that a beam failure condition has occurred, wherein the beam failure condition is associated with transmissions between the WTRU and the base station;
receiving a beam failure recovery request from the WTRU using a Physical Random Access Channel (PRACH) resource, wherein the beam failure recovery request indicates a candidate beam identified by the WTRU,
wherein the beam failure recovery request is received if the candidate beam has been identified by measuring beam quality on at least one of the CSI-RS or the SSB being above a threshold for resolving the beam failure condition, the PRACH resource used to receive the beam failure recovery request being associated with at least one of a reference signal or a synchronization signal block; and
transmitting a response associated with the beam failure recovery request to the WTRU within a time window.

\* \* \* \* \*